(12) United States Patent
Rickman

(10) Patent No.: US 10,034,069 B2
(45) Date of Patent: Jul. 24, 2018

(54) OPTOELECTRONIC SWITCH

(71) Applicant: Rockley Photonics Limited, London (GB)

(72) Inventor: Andrew George Rickman, Marlborough (GB)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 15/317,897

(22) PCT Filed: Sep. 29, 2016

(86) PCT No.: PCT/GB2016/053030
§ 371 (c)(1),
(2) Date: Dec. 9, 2016

(87) PCT Pub. No.: WO2017/055848
PCT Pub. Date: Apr. 6, 2017

(65) Prior Publication Data
US 2017/0289652 A1   Oct. 5, 2017

Related U.S. Application Data

(60) Provisional application No. 62/234,454, filed on Sep. 29, 2015.

(51) Int. Cl.
*G02F 1/29* (2006.01)
*H04Q 11/00* (2006.01)
*H04J 14/02* (2006.01)

(52) U.S. Cl.
CPC .......... *H04Q 11/0005* (2013.01); *H04J 14/02* (2013.01); *H04Q 2011/006* (2013.01);
(Continued)

(58) Field of Classification Search
CPC ..... G02F 1/29; G02B 26/0841; G02B 6/3512; G02B 6/3556; H04Q 11/0005
(Continued)

(56) References Cited

U.S. PATENT DOCUMENTS 5,488,500 A * 1/1996 Glance ............... G02B 6/12021
385/24
5,757,986 A   5/1998 Crampton et al.
(Continued)

FOREIGN PATENT DOCUMENTS

CA   2 386 352 A1   11/2003
EP   0 949 837 A2   10/1999
(Continued)

OTHER PUBLICATIONS

2000 Networkers, Campus Switch Architecture Session 2806, Cisco Systems, Inc., 2000, 65 pages.
(Continued)

*Primary Examiner* — Mohammed Hasan
(74) *Attorney, Agent, or Firm* — Lewis Roca Rothgerber Christie LLP

(57) ABSTRACT

An optoelectronic switch for switching a signal from an input device to an output device includes a plurality of switch modules, each connected or connectable to an optical interconnecting region, wherein: each switch module is configured to output a WDM output signal to the optical interconnecting region, and the optoelectronic switch further includes one or more MZI routers, each configured to direct the WDM output signal from its source switch module towards its destination switch module, wherein the one or more MZI routers are located either on each of the switch modules, or in the interconnecting region.

32 Claims, 23 Drawing Sheets

(52) U.S. Cl.
CPC ............... *H04Q 2011/0011* (2013.01); *H04Q 2011/0016* (2013.01)

(58) Field of Classification Search
USPC ................................................. 359/320, 245
See application file for complete search history.

(56) References Cited

U.S. PATENT DOCUMENTS

| | | | |
|---|---|---|---|
| 5,892,864 | A | 4/1999 | Stoll et al. |
| 5,903,686 | A * | 5/1999 | MacDonald ....... H04Q 11/0005 385/16 |
| 6,061,484 | A * | 5/2000 | Jones .................. G02B 6/2932 385/24 |
| 6,285,809 | B1 | 9/2001 | Nir et al. |
| 6,404,944 | B1 | 6/2002 | Wa et al. |
| 6,445,843 | B1 | 9/2002 | Duer |
| 6,510,260 | B2 | 1/2003 | Chen et al. |
| 6,512,612 | B1 | 1/2003 | Fatehi et al. |
| 6,529,301 | B1 | 3/2003 | Wang |
| 6,768,827 | B2 | 7/2004 | Yoo |
| 7,088,919 | B2 | 8/2006 | Graves |
| 7,116,859 | B2 | 10/2006 | Mino et al. |
| 7,177,544 | B1 | 2/2007 | Wada et al. |
| 7,218,853 | B2 | 5/2007 | Handelman |
| 7,257,283 | B1 | 8/2007 | Liu et al. |
| 7,260,329 | B1 | 8/2007 | Fall et al. |
| 7,389,046 | B1 | 6/2008 | Tanaka et al. |
| 7,426,210 | B1 | 9/2008 | Miles et al. |
| 7,430,346 | B2 | 9/2008 | Jennen |
| 7,526,603 | B1 | 4/2009 | Abdollahi-Alibeik et al. |
| 7,577,355 | B2 | 8/2009 | Sato et al. |
| 7,590,359 | B2 | 9/2009 | Kim et al. |
| 7,724,759 | B2 | 5/2010 | Bozso et al. |
| 7,764,882 | B2 | 7/2010 | Beacken |
| 7,773,606 | B2 | 8/2010 | Dobjelevski et al. |
| 7,773,608 | B2 | 8/2010 | Miles et al. |
| 7,872,990 | B2 | 1/2011 | Guo et al. |
| 7,899,327 | B2 | 3/2011 | Wada et al. |
| 7,974,502 | B2 | 7/2011 | Mino et al. |
| 8,065,433 | B2 | 11/2011 | Guo et al. |
| 8,073,327 | B2 | 12/2011 | Mayer et al. |
| 8,098,593 | B2 | 1/2012 | Guo et al. |
| 8,270,830 | B2 | 9/2012 | Kirkpatrick et al. |
| 8,472,805 | B2 | 6/2013 | Lam et al. |
| 8,473,659 | B2 | 6/2013 | Koka et al. |
| 8,478,089 | B2 | 7/2013 | Akiyama et al. |
| 8,493,976 | B2 | 7/2013 | Lin |
| 8,774,625 | B2 | 7/2014 | Binkert et al. |
| 8,792,787 | B1 * | 7/2014 | Zhao .................. H04B 10/2575 398/48 |
| 8,867,915 | B1 | 10/2014 | Vandat et al. |
| 8,891,914 | B2 | 11/2014 | Ticknor et al. |
| 8,902,751 | B1 | 12/2014 | Zhou et al. |
| 8,942,559 | B2 | 1/2015 | Binkert et al. |
| 8,965,203 | B1 | 2/2015 | Vandat et al. |
| 9,008,510 | B1 | 4/2015 | Zhao et al. |
| 9,124,383 | B1 | 9/2015 | Frankel et al. |
| 9,167,321 | B2 | 10/2015 | Chen |
| 9,167,322 | B1 | 10/2015 | Zhao et al. |
| 9,184,845 | B1 | 11/2015 | Vandat et al. |
| 9,390,877 | B2 | 7/2016 | Bannon et al. |
| 9,456,260 | B2 | 9/2016 | Mehrvar et al. |
| 9,781,059 | B2 * | 10/2017 | Rickman ................ H04L 49/10 |
| 2002/0057861 | A1 | 5/2002 | Ge et al. |
| 2002/0114036 | A1 | 8/2002 | Ghani |
| 2002/0159688 | A1 | 10/2002 | Kim et al. |
| 2002/0186432 | A1 | 12/2002 | Roorda et al. |
| 2003/0138189 | A1 | 7/2003 | Rockwell et al. |
| 2004/0037558 | A1 | 2/2004 | Beshai |
| 2005/0105906 | A1 | 5/2005 | Barbosa et al. |
| 2007/0009262 | A1 | 1/2007 | Perkins et al. |
| 2009/0070549 | A1 | 3/2009 | Solomon |
| 2009/0226183 | A1 | 9/2009 | Kang |
| 2010/0254703 | A1 | 10/2010 | Kirkpatrick et al. |
| 2011/0069963 | A1 * | 3/2011 | McLaren ............ G02B 6/12007 398/115 |
| 2012/0033968 | A1 | 2/2012 | Testa et al. |
| 2012/0148242 | A1 | 6/2012 | Chen et al. |
| 2012/0201540 | A1 | 8/2012 | Uekama et al. |
| 2012/0243869 | A1 | 9/2012 | Sato |
| 2012/0250574 | A1 | 10/2012 | Marr |
| 2013/0330076 | A1 | 12/2013 | Liboiron-Ladouceur et al. |
| 2015/0249501 | A1 | 9/2015 | Nagarajan |
| 2015/0309265 | A1 | 10/2015 | Mehrvar et al. |
| 2016/0091666 | A1 * | 3/2016 | Farrington ......... H04Q 11/0005 385/1 |
| 2016/0094487 | A1 | 3/2016 | Rickman et al. |
| 2017/0041691 | A1 | 2/2017 | Rickman et al. |

FOREIGN PATENT DOCUMENTS

| | | |
|---|---|---|
| GB | 2319335 A | 5/1998 |
| GB | 2523383 A | 8/2015 |
| GB | 2530833 A | 4/2016 |
| GB | 2523383 B | 9/2016 |
| WO | WO 1997/06614 A1 | 2/1997 |
| WO | WO 2007/124514 A2 | 11/2007 |
| WO | WO 2013/063543 A1 | 5/2013 |
| WO | WO 2013/165390 A1 | 11/2013 |
| WO | WO 2014/180292 A2 | 11/2014 |
| WO | WO 2015/060820 A1 | 4/2015 |
| WO | WO 2016/170357 A1 | 10/2016 |

OTHER PUBLICATIONS

66AK2E0x Multicore DSP+ARM KeyStone II System-on-Chip (SoC), System Interconnect, Texas Instruments Incorporated, 2012-2015, pp. 1-282.

Ahn, Jung Ho et al., "HyperX: Topology, Routing, and Packaging of Efficient Large-Scale Networks", ACM, SC'09, Nov. 14-20, 2009, 11 pages, Portland, Oregon, USA.

Andreyev, Alexey, "Introducing data center fabric, the next-generation Facebook data center network", Facebook, Nov. 14, 2014, 13 pages.

Arimilli, Baba et al., "The PERCS High-Performance Interconnect", 18th IEEE Symposium on High Performance Interconnects, 2010, pp. 75-82.

Bhuyan, Laxmi N. et al., "Generalized Hypercube and Hyperbus Structures for a Computer Network", IEEE Transactions on Computers, Apr. 1984, pp. 323-333, vol. C-33, No. 4.

Dong, Ziqian et al., "Hybrid Optoelectronic Packet Switch with Multiple Wavelength Conversion Through an Electronic Packet Switch", IEEE 14th International Conference on High Performance Switching and Routing, 2013, pp. 97-102.

Dumais, Patrick et al., "Scaling up Silicon Photonic Switch Fabrics", IEEE, 2015, pp. 175-176.

Farrington, Nathan et al., "Facebook's Data Center Network Architecture", Optical Interconnects Conference, May 1, 2013, 2 pages.

Guo, Chuanxiong et al., "BCube: A High Performance, Server-centric Network Architecture for Modular Data Centers", ACM, SIGCOMM'09, Aug. 17-21, 2009, Barcelona, Spain.

Hot Interconnects 22, IEEE Symposium on High Performance Interconnects, Aug. 26-28, 2014, 1 page, Google Headquarters, Mountain View, California.

International Search Report and Written Opinion of the International Searching Authority, dated Feb. 7, 2017, Corresponding to PCT/EP2016/076756, 15 pages.

International Search Report and Written Opinion of the International Searching Authority, dated Jun. 6, 2016, Corresponding to PCT/GB2016/051127, 17 pages.

International Search Report and Written Opinion of the International Searching Authority, dated May 2, 2017, Corresponding to PCT/EP2016/076755, 33 pages.

Invitation to Pay Additional Fees and Partial Search Report dated Feb. 23, 2017 in related International Application No. PCT/EP2016/076755, 8 pages.

(56) References Cited

OTHER PUBLICATIONS

Iyer, Sundar et al., "Techniques for Fast Shared Memory Switches", Stanford HPNG Technical Report TR01-HPNG-081501, 2001, 12 pages.
Kachris, Christoforos et al., "A Survey on Optical Interconnects for Data Centers", IEEE Communications Surveys & Tutorials, Oct. 1, 2012, pp. 1021-1036, vol. 14, No. 4.
Kodi, Avinash et al., "Reconfigurable and adaptive photonic networks for high-performance computing systems", Optical Society of America, Applied Optics, Aug. 1, 2009, pp. E13-E23, vol. 48, No. 22.
Mandyam, Lakshmi et al., "Switch Fabric Implementation Using Shared Memory", Freescale Semiconductor, Inc., 2004, pp. 1-8.
Miao, Wang et al., "Novel flat datacenter network architecture based on scalable and flow-controlled optical switch system", Optics Express, Feb. 10, 2014, 8 pages, vol. 22, No. 3.
Padmanabhan, Krishnan et al., "Dilated Networks for Photonic Switching", IEEE Transactions on Communications, Dec. 1987, vol. COM-35, No. 12., pp. 1357-1365.
Parsons, N.J. et al., "Multidimensional Photonic Switches", Photonic Switching II, Proceedings of the International Topical Meeting, Apr. 12-14, 1990, pp. 364-369, Kobe, Japan.
Suzuki, Keijiro et al., "Ultra-compact 8×8 strictly-non-blocking Si-wire PILOSS switch", Optics Express, Feb. 24, 2014, 8 pages, vol. 22, No. 4.
Tabatabaee, Vahid, "Switch Fabric Architectures", University of Maryland, ENTS689L: Packet Processing and Switching, Fall 2006, pp. 1-18.
U.K. Intellectual Property Office Search Report, dated Jan. 30, 2017, for Patent Application No. GB1611433.2, 3 pages.
U.K. Intellectual Property Office Search Report, dated Nov. 29, 2016, for Patent Application No. GB1611197.3, 3 pages.
Wu, Haitao et al., "MDCube: A High Performance Network Structure for Modular Data Center Interconnection", ACM, CoNEXT'09, Dec. 1-4, 2009, Rome, Italy.
Zahavi, Eitan et al., "Quasi Fat Trees for HPC Clouds and their Fault-Resilient Closed-Form Routing", HOTI 2014, pp. 1-21.
Zahavi, Eitan, "Fat-tree routing and node ordering providing contention free traffic for MPI global collectives", Journal of Parallel and Distributed Computing, 2012, pp. 1-10.
Campenhout, Joris Van et al., "Low-power, 2×2 silicon electro-optic switch with 110-nm bandwidth for broadband reconfigurable optical networks", Optics Express, Dec. 21, 2009, pp. 24020-24029, vol. 17, No. 26.
Cheng, Q. et al., "Demonstration of the Feasibility of Large Port Count Optical Switching Using a Hybrid MZI-SOA Switch Module in a Recirculating Loop", Optical Society of America, 2014, 5 pages.
Communication Relating to the Results of the Partial International Search, dated Dec. 15, 2016, Corresponding to PCT/GB2016/053030, 3 pages.
Kumar, Santosh et al., "1×8 Signal Router Using Cascading the Mach-Zehnder Interferometers", IEEE/ICAIT, Jul. 6, 2013, 2 pages.
Kumar, Santosh et al., "Implementation of optical switches using Mach-Zehnder interferometer", Optical Engineering, Sep. 2013, pp. 097106-1 through 097106-9, vol. 52, No. 9.
Lee, Benjamin G. et al., "Four- and Eight-Port Photonic Switches Monolithically Integrated with Digital CMOS Logic and Driver Circuits", OSA, 2013, 3 pages.
Miao, Wang et al., "Petabit/s Data Center Network Architecture with Sub-microseconds Latency Based on Fast Optical Switches", ECOC, 2015, ID: 0630.
Shekel, Eyal et al., "Optical packet switching", Optical Transmission, Switching, and Subsystems II, 2005, pp. 49-62, vol. 5625, SPIE, Bellingham, WA.
U.S. Appl. No. 62/309,425, filed Mar. 16, 2016.
Ye, Tong et al., "AWG-based Non-blocking Clos Networks", IEEE, Aug. 21, 2013, pp. 1-13.
Horst, Folkert et al., "Cascaded Mach-Zehnder wavelength filters in silicon photonics for low loss and flat pass-band WDM (de-)multiplexing", Optics Express, May 20, 2013, pp. 11652-11658, vol. 21, No. 10.
International Search Report and Written Opinion of the International Searching Authority, dated Feb. 7, 2017, Corresponding to PCT/GB2016/053030, 18 pages.
Kotiyal, Saurabh et al., "Mach-Zehnder Interferometer Based Design of All Optical Reversible Binary Adder", EDAA, 2012, 6 pages.
"Nano-Second Speed PLZT Photonics", EpiPhotonics, Dec. 2011, 1 page.
Nashimoto, Keiichi, "Nano-Second Speed PLZT Waveguide Switches and Filters", EpiPhotonics, Dec. 2011, 4 pages.
Srivastava, Arpita et al., "Switching behaviour of a nonlinear Mach-Zehnder interferometer", Pramana Journal of Physics, Apr. 2010, pp. 575-590, vol. 74, No. 4, Indian Academy of Sciences.
Farrington, Nathan et al., "Data Center Switch Architecture in the Age of Merchant Silicon", High Performance Interconnects, Aug. 25, 2009, pp. 93-102.
International Search Report and Written Opinion of the International Searching Authority, dated Jun. 30, 2017, Corresponding to PCT/EP2017/056129, 19 pages.

\* cited by examiner

OPTOELECTRONIC SWITCH

CROSS-REFERENCE TO RELATED APPLICATION(S)

This application is a National Phase Patent Application and claims priority to and the benefit of International Application Number PCT/GB2016/053030, filed on Sep. 29, 2016, which claims priority to and the benefit of U.S. Provisional Patent Application No. 62/234,454, filed on Sep. 29, 2015, the entire contents of all of which are incorporated herein by reference.

FIELD

The present invention relates to an optoelectronic switch, including a plurality of switch modules, which utilizes one or more MZI routers to direct signals from an input device to an output device.

BACKGROUND

Optoelectronic switches using a combination of active and passive components to switch in the optical domain are known. The path of an optical signal in a passive component such as an AWG will depend upon its wavelength. In some related art configurations, it is necessary to provide tunable laser light to enable the control of wavelength of signals and therefore ensure that each signal reaches its desired destination ports as a result of the optical properties of the passive optical switching components. However, tunable lasers are typically more expensive than fixed wavelength lasers and their control can be more complex and expensive.

U.S. Ser. No. 14/715,448, describes the use of concentration of optical packets together wavelength division multiplexing.

Optical circuit switches that are wavelength independent (at least within a given wavelength band) are known and Mach Zehnder optical switches are known, for example in signal routing and in adding and dropping. An example is given by Kumar et al. in IEEE/ICAIT 6 Jul. 2013. Mach Zehnder interferometers are known to have been implemented on silicon on insulator platforms as shown, for example in GB 2319335.

SUMMARY

Accordingly, the present invention aims to solve the above problems by providing, according to a first aspect, an optoelectronic switch comprising: a plurality N of switch modules; and an optical backplane (C5) which includes a passive fiber shuffle; wherein each switch module is pluggably connectable to the optical backplane, each switch module comprising: a plurality M of client facing input ports (IP1, IP2, IPM), and a corresponding plurality M of client facing output ports (OP1, OP2, OPM); an outgoing optical connection to the optical backplane (C5) and an incoming optical connection to the optical backplane (C5); a plurality of Detector Remodulators (DRMs) (C3) each DRM of the plurality configured to receive optical signal(s) from one of the input ports of the switch module (IP1, IP2, IPM) and to regenerate and/or change the wavelength of the received signal(s) to produce respective DRM optical output(s); a pre-backplane AWG (C4), the pre-backplane AWG acting as a multiplexor to multiplex M inputs to a wavelength division multiplexed (WDM) output signal; and a post-backplane AWG (C6) configured to route optical signals received at the incoming optical connection of the switch module from the backplane to the desired one or more of the client facing output ports; wherein the optoelectronic switch further comprises a Mach Zehnder router which receives the WDM output signal from the pre-backplane AWG, and switches the WDM signal before it enters the passive fiber shuffle to choose the required destination switch module; the Mach Zehnder router being located either: on the switch module; or within the optical backplane, between the switch module and the passive fiber shuffle.

Optional features of the invention will now be set out. These are applicable singly or in any combination with any aspect of the invention.

Signals which are to be "switched" from a client input port to a client output port of the same module may be routed back to the same module electronically. This would mean that the fabric ports would include only N−1 fabric input ports and N−1 fabric output ports (i.e. that the total number of switches is one greater than the total number of input connections that each switch has with the optical full-mesh fabric).

A Detector Remodulator (DRM) is a device used to convert a first optical signal to a second optical signal. For the purpose of the present invention, the first optical signal will have a first wavelength and the second optical signal may have a second wavelength different to the first wavelength so that each of the DRMs function as a wavelength converter.

The DRM includes a photodetection stage (e.g. a photodiode) where the first optical signal (modulated) is detected and converted into an electrical signal. The photodetection stage is followed by a modulation stage (i.e. a modulator) configured to receive the electrical signal from the photodetection stage and also to receive an unmodulated light input having a fixed wavelength. The unmodulated light input is modulated by the modulated electrical signal produced at the photodetection stage. The modulated optical signal that is created at the modulation stage will therefore have a wavelength that corresponds to that of the unmodulated light signal. Whilst in the electrical domain, the signal may advantageously be processed, for example by one or more of: amplification, reshaping, re-timing, and filtering before being applied to the second wavelength/channel. Each DRM may therefore include a CMOS chip for carrying out one or more of these functions, the CMOS chip connecting the photodetector of the DRM to the modulator of the DRM.

In our GB 1403191.8, the complete disclosure of which is herein incorporated by reference, we describe a number of examples of Detector Remodulators (DRMs) that could form one or more of the DRMs of the present invention. The DRMs of this application differ from those of GB 1403191.8 in that the unmodulated input they receive is of a fixed wavelength rather than a tunable wavelength.

One example of a Detector Remodulator may comprise a silicon on insulator (SOI) waveguide platform including: a detector coupled to a first input waveguide (for receiving the first optical signal); a modulator coupled to a second input waveguide (for receiving the fixed wavelength input) and an output waveguide; and an electrical circuit connecting the detector to the modulator; wherein the detector, modulator, second input waveguide and output waveguide may be arranged within the same horizontal plane as one another; and wherein the modulator includes a modulation waveguide region at which a semiconductor junction is set horizontally across the waveguide. The modulation region may be a phase modulation region or an amplitude modulation region. However, it should be understood that any suitable DRM configured to act as a wavelength converter could be used.

The signal from each input of the switch module may be provided to the first array of DRMs directly or indirectly. When applied indirectly, a signal from an input of the switch module may reach an input of one of DRMs or the first array of DRMs via other components as explained in more detail below.

The close photonic/electronic integration of the present invention reduces power consumption. Switching in optical domain bypasses electronics speed and size bottleneck.

Furthermore, the innovative network architecture increases scalability and reduces hardware required.

The optical backplane may comprise a full mesh optical interconnect (also referred to as a fully connected network); a network topology in which there is a direct link between all possible pairs of switch modules (nodes). For example, in a full mesh interconnect having n nodes, there are n(n−1)/2 direct links. Such interconnects advantageously may provide a large number of optical links between nodes, for example, sufficient to render the system non-blocking.

The optoelectronic switch may have any one of or, to the extent that they are compatible, any combination of the following optional features.

The Mach Zehnder router may comprise: a plurality of Mach Zehnder Interferometer (MZI) switches arranged in a matrix. This may be in the form of a 1×N router, the plurality of MZI switches arranged in a tree formation. Rather than a 1×N router, the MZI matrix could instead function as an N×N router or a combination of 1×N and N×M.

Such a matrix may take the form of a "tree" in which a signal may be routed to N destinations. For a tree formation with 8 outputs (i.e. where N=8) the MZI router comprises: a first stage comprising a single Mach-Zehnder switch; a second stage comprising two Mach-Zehnder switches; a third stage comprising three Mach Zehnder switches; a fourth stage comprising two Mach Zehnder switches. Each switch comprises two input arms and two output arms.

It is further envisaged that the MZI router could include power taps.

Optionally, each DRM of the plurality of DRMs (C3) includes: a photodetection stage where the optical signal(s) from a respective one of the input ports of the optoelectronic switch are received and converted into electrical signal(s); a CMOS chip for processing the electrical signal(s) and transmitting the processed signal(s) to the modulator; a modulation stage for: receiving the processed electrical signal(s) from the CMOS chip; receiving unmodulated light input having a fixed wavelength; and for modulating the unmodulated light according to the output of the CMOS chip.

Optionally, processing of the electrical signal by the CMOS chip includes one or more of: concentration; amplification; reshaping; re-timing; and filtering of the signal before it is received by the modulator.

Optionally, the DRM operates in burst mode, the CMOS chip including circuitry which collects signals and sends these in bursts depending on their destination.

Optionally, the optoelectronic switch further comprises a second array of Detector Remodulators (DRMs) (C7) located after the post-backplane AWG, each DRM of the second array configured to regenerate and/or convert the wavelength of a signal from a respective output port of the post-backplane AWG for communication to an output port (OP1, OP2, OPM) of the switch module.

Optionally, the post-backplane AWG is an N×M AWG (C6), the post-backplane AWG having N inputs and M outputs, each of the N inputs connected to a respective output of the optical full-mesh interconnect backplane (C5) and each of the M outputs of the N×M AWG for communicating a signal to one or more of the M outputs (OP1, OP2, OPM) of the switch module. The optical connection from the AWG to the output ports of the switch module may be direct or may be via other components such as further DRM modules.

Optionally, the post-backplane AWG is a 1×M AWG; and wherein the optoelectronic switch further comprises a post-backplane MZI router; wherein the 1×M AWG has a single input and M outputs, the single input connected to the post-backplane MZI router and each of the M outputs of the 1×M AWG for communicating a signal to one or more of the M outputs (OP1, OP2, OPM) of the switch module. Again, the optical connection from the AWG to the output ports of the switch module may be direct or may be via other components such as further DRM modules.

Optionally, the optoelectronic switch further comprises a rearrangement AWG (C2) located before the first array of DRMs (C3), the rearrangement AWG having M input ports and M output ports, each of the M input ports connected to an output of a respective DRM of the second array of DRMs; and each output port of the rearrangement AWG connected to an output of the switch module.

The presence of a rearrangement AWG after the post-backplane AWG means that communication of a signal from an input port of the switch module to a respective input port of the pre-backplane AWG includes an extra rearrangement step. In this way, overall bandwidth of the switch can be increased.

According to a second aspect of the present invention, there is provided a switch module for pluggably connecting to an optical backplane, the switch module comprising: a plurality M of client facing input ports (IP1, IP2, IPM), and a corresponding plurality M of client facing output ports (OP1, OP2, OPM); an outgoing optical connection to the optical backplane (C5) and an incoming optical connection to the optical backplane (C5); an array of Detector Remodulators (DRMs) (C3) each DRM of the array configured to receive optical signal(s) from one of the input ports of the switch module (IP1, IP2, IPM) and to regenerate and/or change the wavelength of the received signal(s) to produce respective DRM optical output(s); a pre-backplane AWG (C4), the pre-backplane AWG acting as a multiplexor to multiplex M inputs to a wavelength division multiplexed (WDM) output signal; and a post-backplane AWG (C6) configured to route optical signals received at the incoming optical connection of the switch module from the backplane to the desired one or more of the client facing output ports.

The switch module may further comprise: a Mach Zehnder router which receives the WDM output signal from the pre-backplane AWG, and switches the WDM signal before it enters the passive fiber shuffle to choose the required destination switch module; the Mach Zehnder router being located on the switch module.

Optionally, each optoelectronic switch module is constructed on one or more silicon-on-insulator photonic platforms.

According to a third aspect of the present invention, there is provided: an active backplane for use with the switch module of claim 10, the active optical backplane comprising: a plurality of optical inputs paired with respective outputs, each input/output pair for connecting to a respective switch module, each input for receiving a WDM optical signal from said respective switch module; a passive fiber shuffle; and a Mach Zehnder router located between each optical input of the active backplane and the passive fiber shuffle; wherein the Mach Zehnder router acts as a switch to select the desired fiber for any given signal through the passive fiber router.

Optionally the switch fabric may consist of one Z×Z switch or a combination of switches. For example: 1×N switches connecting the WDM outputs of modules to N×N switches in a switch fabric. All of the switches may be MZI switches or similar.

The optoelectronic switch may be configured to act as a burst switch. In this way, the DRMs are configured to send multiple packets from the same source to the same destination consecutively.

The optoelectronic switch may be configured to act as a packet switch.

A packet switch embodiment will differ from a circuit switch embodiment in that the DRMs of the switch module contain additional circuitry. In particular, a packet processor may determine which output port each packet should be sent to, based on the contents of each packet. A scheduler would also be present to control the overall timing of each packet through the switch by way of control of the fixed wavelength laser inputs for each DRM.

Where the packet switch functions in burst mode this may be facilitated by the CMOS chip including circuitry which collects signals and sends these in bursts depending on their destination.

The optoelectronic switch may be configured to act as a cell switch.

In this way, the DRMs are configured in a similar way to that of the packet switch but uses fixed length cells. Scheduling the transfer of packets therefore may involve the extra step of segmenting the data into fixed length cells (segments).

The optoelectronic switch may be configured to act as a circuit switch. Circuit switch connections may involve dedicated point-to-point connections during data transfer. This simplifies the design of the DRM as less functionality is required.

Optionally, the optical full-mesh interconnect has a folded configuration which forms a fold in the optoelectronic switch module, wherein for each optoelectronic switch module: the pre-backplane AWG is located before the fold; and the post-backplane AWG located after the fold.

For the purpose of the present invention, the "folded configuration" means that the client inputs and client outputs are located at the same client interface. In the embodiments described herein, the folded configuration is facilitated by the design of the switch module as a single component of the switch module may be built to incorporate both pre-backplane and post-backplane components. In this way, the single component will be configured to process not only pre-backplane signals (i.e. those signals transmitted to the mesh), but also post-backplane signals (i.e. those signals received from the mesh).

Optionally, the input and output ports of each optoelectronic switch module are all arranged on a single external panel.

The input and output ports of each optoelectronic switch module may all arranged on a single external panel.

Preferably, the optoelectronic switch is constructed on one or more silicon-on-insulator photonic platforms.

The combination of a silicon photonics platform and the structure of the architecture enables easy scaling to higher radix. Furthermore, the silicon photonics platform is highly manufacturable at low cost.

Another aspect of embodiments of the invention exploits the enhanced active-switching capability afforded by Mach-Zehnder interferometers, and the consequent increase in the bandwidth of an optoelectronic switch containing them. Broadly speaking, according to this aspect of embodiments of the invention, a signal arriving at one switch module (i.e. an input switch module or a source switch module) is then transferred to another switch module (i.e. an output or destination switch module) using active switches which are based on Mach-Zehnder interferometers, (MZI switches). The MZI switches (or MZIs) are referred to herein as "MZI routers". How the MZI router "knows" which is the destination switch module may be achieved in numerous ways, as will be described later on in the application. Accordingly, a fourth aspect of the present invention provides an optoelectronic switch for switching a signal from an input device to an output device, the optoelectronic switch including a plurality of switch modules, each connected to or connectable to an optical interconnecting region, wherein: each switch module is configured to output a WDM output signal to the optical interconnecting region, and the optoelectronic switch further includes one or more MZI routers, each configured to direct the WDM output signal from its source switch module towards its destination switch module, the one or more MZI routers located either:
on the switch modules, or
in the interconnecting region.

It must be noted that embodiments of this aspect of the invention may also include the features set out previously with reference to the first, second and third aspects of the invention, where they are compatible. In the interests of conciseness, such combinations of features are not restated here. For example, the optical interconnecting region of the present aspect of the invention may replace the optical backplane of previous aspects of the invention. However, it will be appreciated that in some embodiments of the present aspect of the invention, the optical interconnecting region may be in the form of an optical backplane, or may include an optical backplane.

The MZI routers may include electro-optic MZI switches which afford fast switching capability. Alternatively, thermal MZI switches may be employed. In this disclosure, an electro-optic MZI is to be understood as an MZI in which electrical effects, such as (but by no means limited to) the application of a current across a junction, are used to modulate a beam of light. For example, the MZI router may be in the form of an MZI cascade switch, including a plurality of MZIs, each having two arms which split at an input coupler, with two arms feeding the split paths into an output coupler where they are recombined, and two output portions. In some embodiments, the MZIs may be 1×2 MZIs, in which there is only one input to the input coupler, and in other embodiments, the MZIs may be 2×2 MZIs, in which there are two inputs to the input coupler.

The plurality of MZIs are preferably arranged to provide a pathway from each input to each output of the MZI cascade switch. To the greatest extent possible, the arms may have the same length. Alternatively, where it is desirable to have a default output, the arms may be unbalanced. Each MZI may include an electro-optical region at one or both arms, in which the refractive index depends on a voltage applied to the region via one or more electrodes. The phase difference of light travelling through the electro-optical region can therefore be controlled by application of a bias via the electrodes. By adjusting the relative phase difference between the two arms, and therefore the resulting interference at the output couple, the light can be switched from one output of the MZI to the other.

The MZI cascade switch may have $R_i$ inputs and $R_i$ outputs, and these may be made up, for example, of a plurality of 1×2, 2×2 and/or 2×1 MZIs (or any combination of these) arranged to provide a pathway from each input to each output. A MZI cascade switch, or any other active switch such as this is beneficial over a full mesh for connecting $R_i$ interconnecting switch modules when Ri is 5 or more, since a full mesh requires ½·$R_i(R_i-1)$ optical fibers to connect all of the fabric portions, whereas an active switch may provide the same connectivity using only 2Ri optical fibers. It is possible to create an MZI cascade switch with $R_i=2n$ inputs and outputs by building $R_i$ "1× $R_i$ demux trees" and $R_i$ "$R_i$×1 mux trees", wherein each tree includes n stages of 1×2 (demux) or 2×1 (mux) switches, with 2 k switches at the kth stage. An additional port may be supported on each cascade switch by building $R_i+1$ trees on each side and omitting an internal connection so that an input is not connected to the output which is connected to the same switch as itself. An MZI cascade switch such as this is largely wavelength-agnostic, and so is able to switch the whole multiplexed fabric output signal from input to output without requiring any demultiplexing/multiplexing at the inputs and outputs.

MZI routers according to this aspect of the invention may have the same structure as the MZI routers of the first aspect of the invention (e.g. a matrix or a tree structure), described in detail earlier in this application, and in the above paragraph.

The MZI routers may not direct the signal directly from the source switch module to the destination switch module. Rather, the optoelectronic switch may include an intermediate switching device having a plurality of inputs and outputs. The MZI router may be connected between the source switch module and the intermediate switching device, and so be configured to receive the WDM output signal from the source switch module. In such embodiments, outputs of the MZI router may be connected to inputs of the intermediate switching device. Different inputs of the intermediate switching device may correspond to different outputs of the intermediate switching device, and accordingly to different destination switch modules. The MZI router may be configured to direct the optical signal received at one of its inputs to an output which corresponds to (i.e. points toward) the required destination switch module for that signal, i.e. to select an input of the intermediate switching device. In order to achieve this, the MZI router may be connected to a controller which is configured to control the direction of the signal, based for example on destination information contained in the signal. For example, in embodiments wherein the optoelectronic switch is a packet switch, and therefore in which the signal is in the form of a packet of data, the destination information may be stored in a packet header. The intermediate switching device may be a passive switching device, such as a fibre shuffle, as described earlier in this application. Alternatively, the intermediate switching device may be an active device such as an electronic packet switch or cell switch, or an electronic or optical circuit switch. In some embodiments, in which switch modules include a post-interconnect AWG, the intermediate switching device may output the WDM signal to an input of the post-interconnect AWG.

In some embodiments, the MZI router as described above may be a pre-interconnect MZI router, and the optical interconnecting region may also include a post-interconnect MZI router which is configured to direct signals which are output from the intermediate switching device towards their destination switch module. In some embodiments, the post-interconnect MZI routers may be configured to output WDM signals to the inputs of post-interconnect AWGs as described above.

It is understood that each of the optional features described above in relation to the optoelectronic switch of the first aspect are equally applicable to the optoelectronic switch module of the second aspect.

Further optional features of the invention are set out below.

BRIEF DESCRIPTION OF DRAWINGS

Embodiments of the invention will now be described by way of example with reference to the accompanying drawings in which.

DETAILED DESCRIPTION

Figure 1:
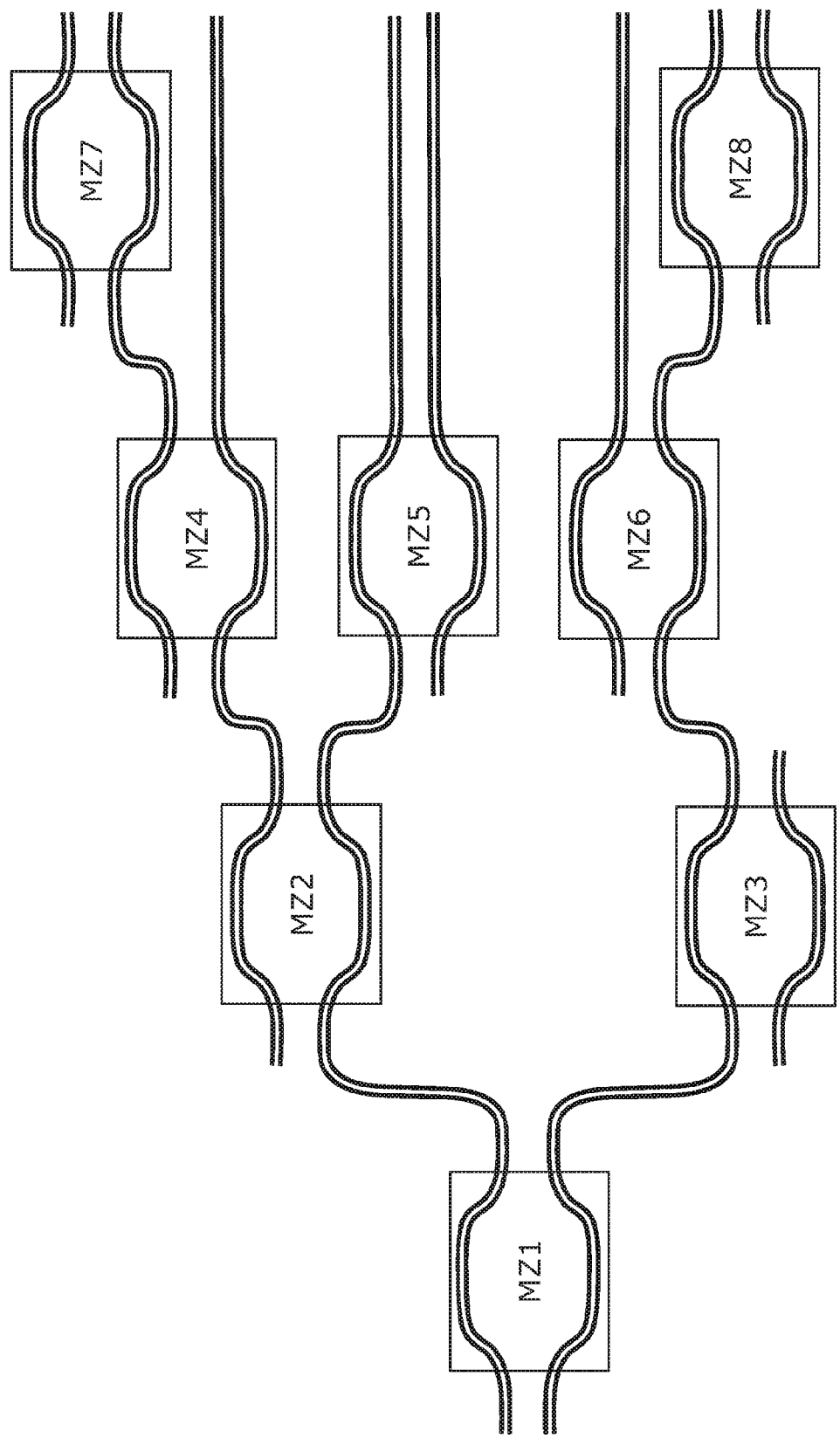
FIG. 1 shows a schematic layout of waveguides which form a Mach Zehnder Interferometer (MZI) router.

FIG. 1 shows how individual waveguide Mach-Zehnder interferometers may be linked together, ultimately to form a Mach Zehnder Interferometer (MZI) router for use with the present invention. More detailed examples are shown in FIGS. 12 to 17. The switch shown in FIG. 1 comprises 8 Mach Zehnder interferometers arranged in a cascade, each MZI having two input arms which split at an input coupler, two arms feeding the split paths into an output coupler where they are recombined, and two output ports.

The two arms have the same length, as far as is possible. In alternative embodiments (not shown), particularly where it is desirable for an output to default to one MZI output port over the other, the two arms of the MZIs may have unbalanced arms. For the MZI router shown in FIG. 1 switching to any of the 8 outputs could be desired and there is no preference for one path through an MZI over another, so equal length arms are used. It can be difficult to fabricate exactly equal lengths, but this can be compensated for by electrical biasing.

The input coupler would typically take the form of a 50:50 coupler, although it is envisaged that other ratios may be desirable.

Each Mach-Zehnder interferometer includes an electro-optical region at one or both arms in which the refractive index depends upon a voltage applied to the region via one or more electrodes. The phase difference of light travelling through the electro-optical region can therefore be controlled by application of a bias via the electrodes. By adjusting the phase difference, and therefore the resulting interference at the output coupler of the two arms, the light can be "switched" from one output of a MZI to another.

Each MZI may have 3 electrodes (as with those disclosed in Kumar, "1×8 Signal Router Using Cascading the Mach-Zehnder Interferometers, IEEE/ICAIT 6 Jul. 2013.

Alternatively, for more control, each MZI could have 4 electrodes (2 on each arm). Indeed, each MZI may have more than one pair of electrodes per arm.

Figure 2:
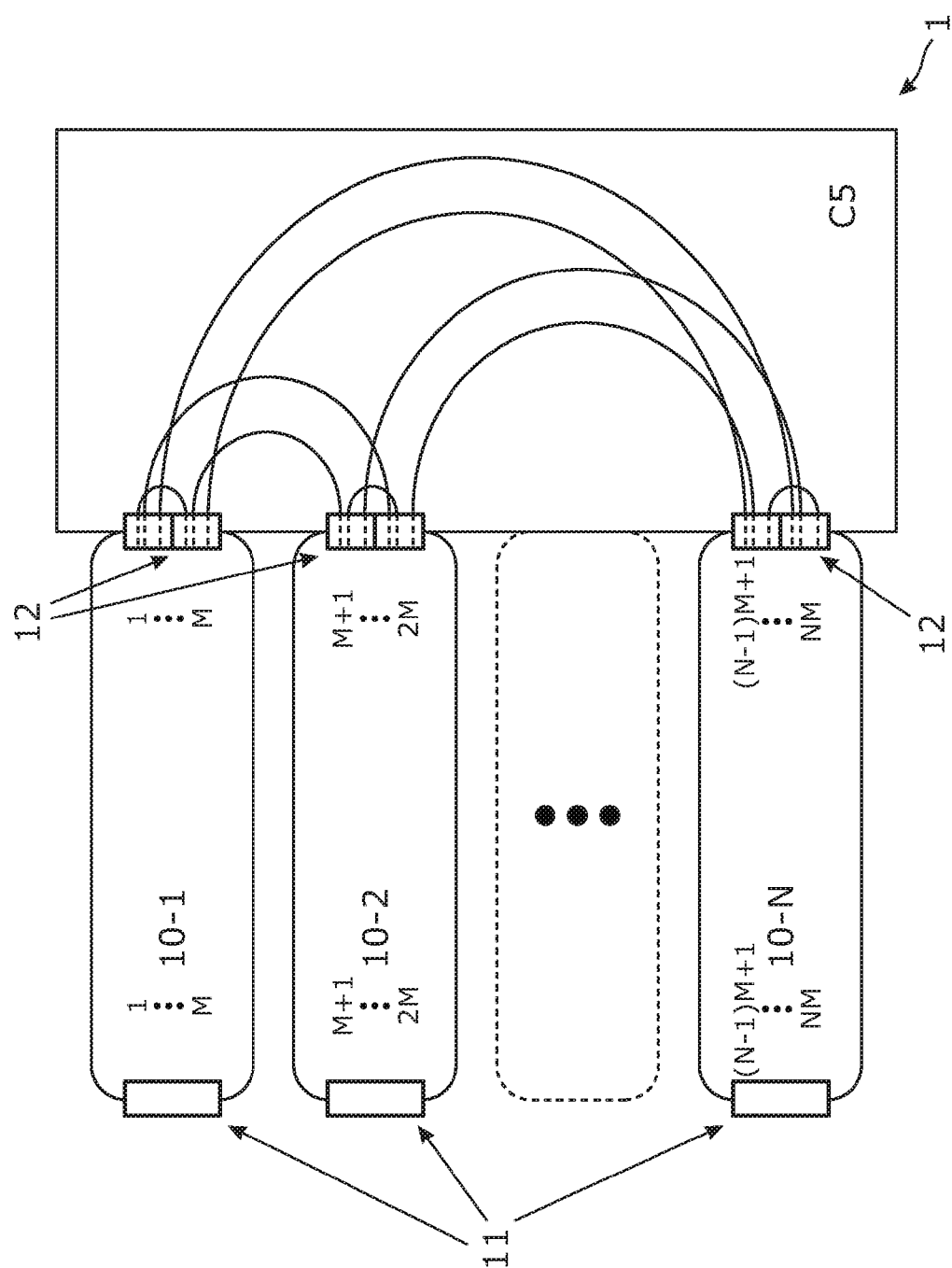
FIG. 2 is a schematic diagram of an optoelectronic switch comprising an array of up to N switch modules and a common optical full-mesh fabric (optical full-mesh interconnect)

FIG. 2 shows an optoelectronics switch including a plurality of optical modules typical of the sort in which the MZ cascade would find application. The optoelectronic switch 1 shown is organized as an array of up to N switch modules 10-1, 10-2, 10-N which are plugged into a common optical backplane C5. In this case the optical backplane takes the form of an optical full-mesh fabric (optical full-mesh interconnect) although as described below, it is possible for the optical backplane to comprise active switching elements.

Each switch module has a client interface 11 comprising M client facing ports, each of which may be a bidirectional client-facing port with two or more fibers (e.g. with an input fiber and an output fiber) per port. For a 100G (i.e. 100 Gb/s) bidirectional port there might be 4×25G input fibers and 4×25G output fibers.

In addition, each switch module has an optically ingoing optical connection and an outgoing optical connection at the opposite side of the switch module to the client facing port. Such ingoing and outgoing connections may be pluggable connections.

In the optoelectronic switch of FIG. 2, the optical full-mesh fabric contains N times N fibers and connects each module to each other module with two fibers, one fiber for each direction of communication. Switch modules can either be integrated with the optical full-mesh fabric or separated with connectors to allow for incremental deployment and ease of maintenance.

The switch is capable of operating with fewer than N switch modules in place so can be scaled according to requirements.

In each of the switch modules operated within a packet switch environment, bursts of wavelength division multiplexed (WDM) concentrated packet signals are created and transmitted via the optical backplane C5 to destinations according to the layout (topology) of that fabric.

The switch modules 10-1, 10-2, 10-N and/or part of the optical backplane C5 include a MZI router switch. Where the optical backplane itself includes the MZI router, the MZI router may make up the entire fabric of the backplane. Alternatively, the optical backplane may be formed of the MZI router in combination with a passive optical mesh of fibers and/or additional optical switches (e.g. MEMS switches).

Figure 3:
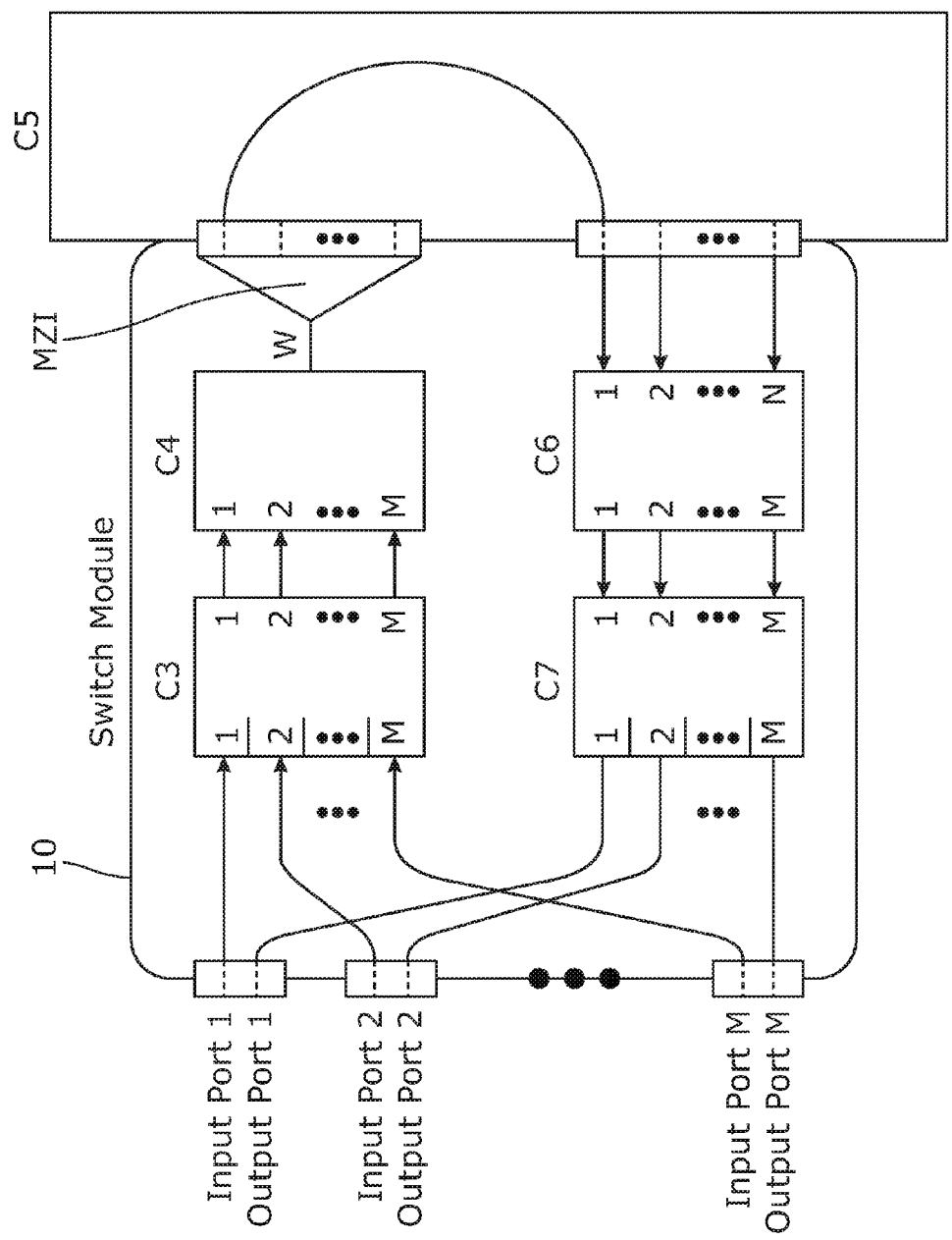
FIG. 3 is a schematic diagram of one of the optoelectronic switch modules of FIG. 2, the optoelectronic switch module having a folded configuration and including a Mach Zehnder Interferometer router.

FIG. 3 shows the constructions of an optoelectronic switch module 10 which could correspond to any one of the switch modules 10-1, 10-2, 10-N of FIG. 2.

The switch module 10 has a folded configuration, with a pre-backplane section (including the DRM arrays C3 and C4, the output waveguide W, and the MZI) acting upon signals from M client ports and converting these to signals for transmission via the backplane. The post-backplane section takes signals received from the backplane and processes them for transmission from the outgoing M client ports.

The M client-facing input ports are connected to the inputs of C3, an array comprising a plurality M of DRMs, using M optical fibers. The DRMs regenerate the signals and convert the wavelengths such that each output of each DRM in the array is carried on one of N wavelengths.

The lasers providing non-modulated light of the N wavelengths to the respective DRMs C3 have fixed wavelengths. During set up and over their lifetime the fixed wavelength lasers may need to have their wavelengths adjusted (shimmed) but the person skilled in the art will understand that the wavelengths are essentially fixed during ordinary use. The wavelengths of the lasers providing laser light to DRMs C4 will be arranged progressively or incrementally, typically in a "grid" across the wavelength band of the N×1 AWG C4.

The N×1 AWG C4 multiplexes all of the wavelengths of the modulated light signals from the DRMs C3 into a single output waveguide W which forms a single connection with the one of the M fibers of the optical full-mesh switch fabric C5.

In the embodiment shown in FIG. 3, optical signals received by the switch module 10 from the backplane pass through an N×M AWG. The M outputs of the AWG are optically connected to an array of post-backplane DRMs which act to regenerate and/or change the wavelength of the optical signal before it is transmitted from a respective one of the M client output ports.

Figure 4:
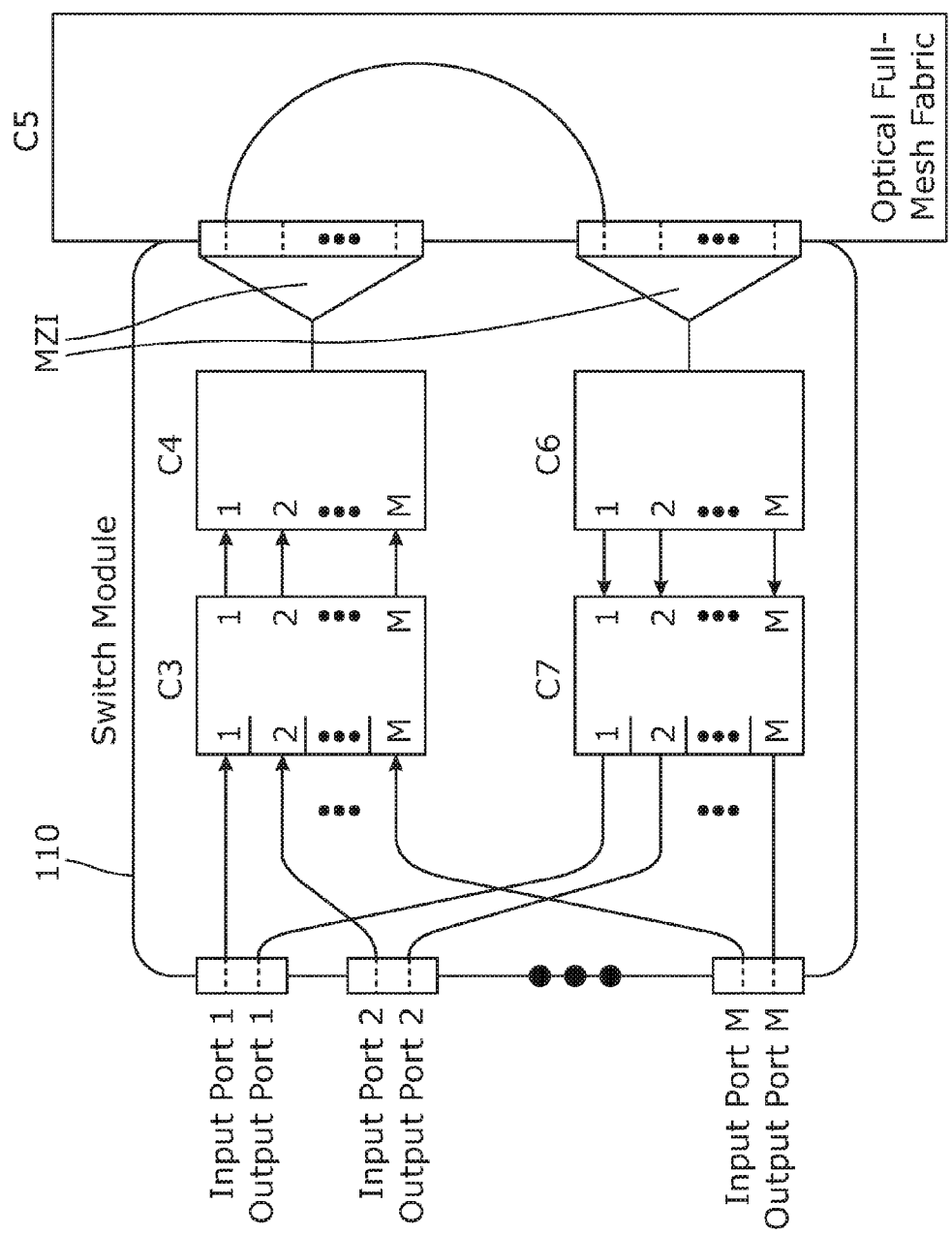
FIG. 4 shows a schematic diagram of one of the optoelectronic switch modules of FIG. 2, the optoelectronic switch module having a folded configuration where the input to the optical full-mesh fabric and output from the optical full-mesh fabric both include a Mach Zehnder switch.

The embodiment of FIG. 4 differs from that of FIG. 3 in that a further MZI is located at the post-backplane fiber connection between the switch module and the backplane. The post-backplane AWG therefore takes the form of a 1×N AWG.

Figure 5:
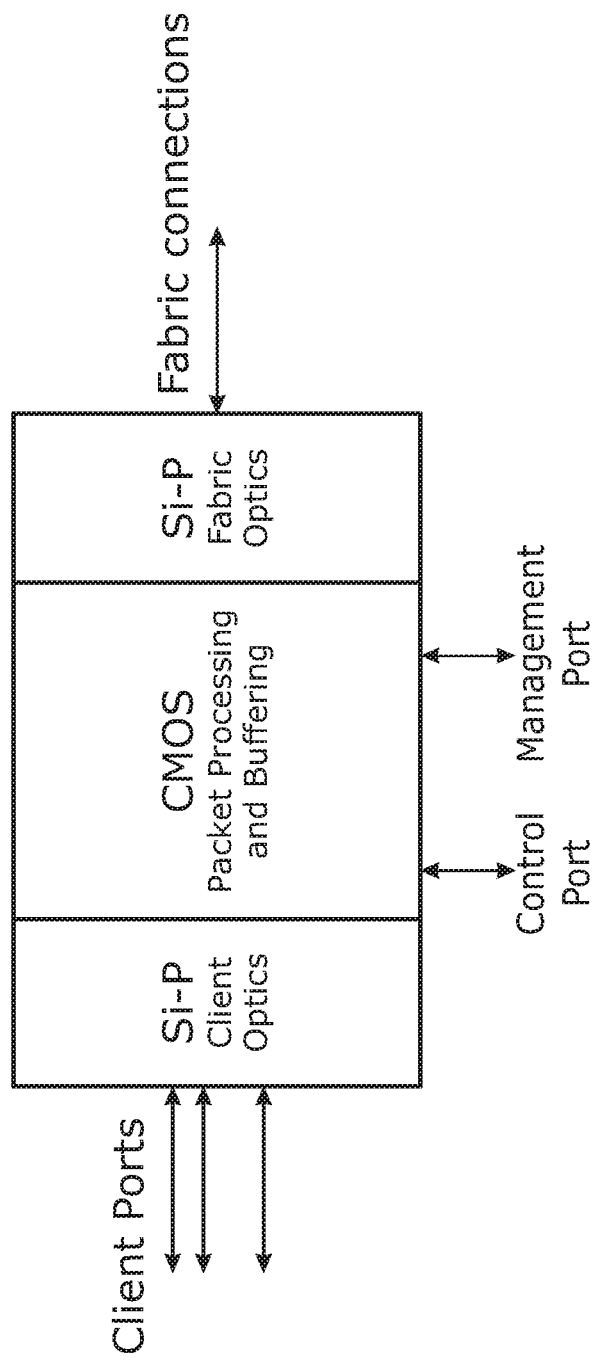
FIG. 5 is a schematic diagram of the operation of the switch modules of FIG. 3 and FIG. 4.

A schematic diagram of the operation of both the embodiments of FIG. 3 and FIG. 4 is shown in FIG. 5 where it can be seen that a single CMOS chip acts to process both incoming and outgoing optical signals between the client optics and the fabric optics. The CMOS chip includes packet processing and buffering circuitry and includes an electrical control port as well as a management port.

Figure 6:
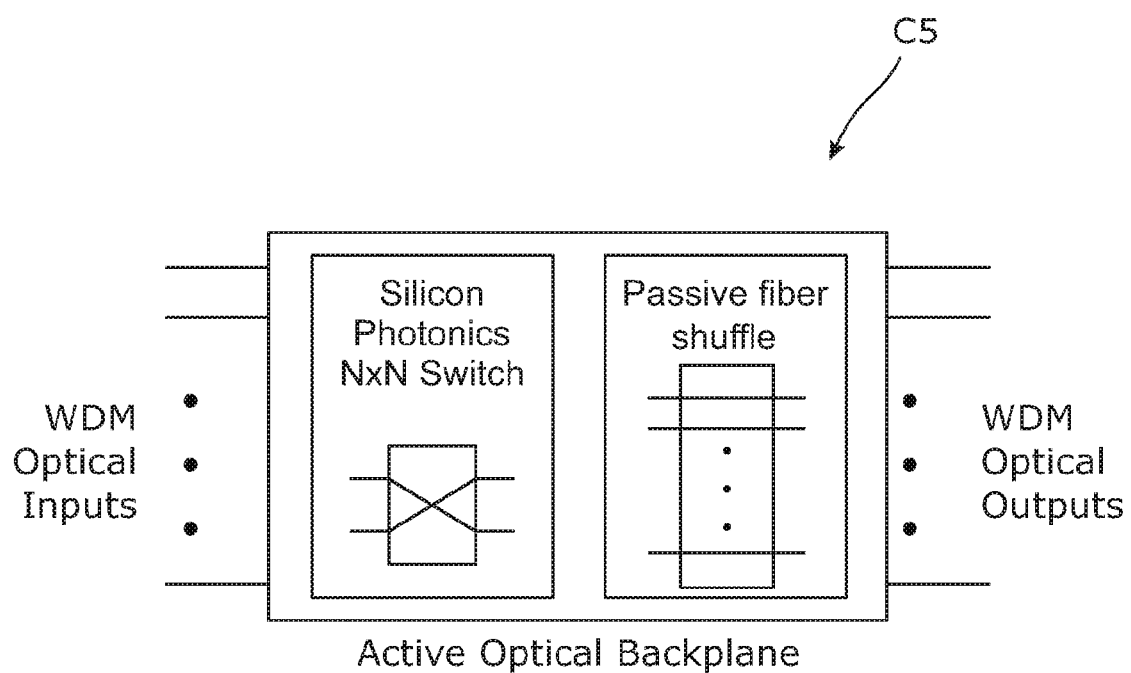
FIG. 6 is a schematic diagram of an active backplane for use with any one of the optical switch modules described herein.

The switch modules of FIG. 3 and FIG. 4 could be used with a passive optical backplane or an active optical backplane. By using an active optical backplane, the bandwidth of the entire system is increased. An example of such an active optical backplane is shown in FIGS. 6 and 7.

Wavelength demultiplexed optical input signals enter the backplane via inputs of an N×N silicon photonics switch before reaching a passive fiber shuffle which provides an optical connection to all of the switch modules which are plugged into the active optical backplane.

Figure 7:
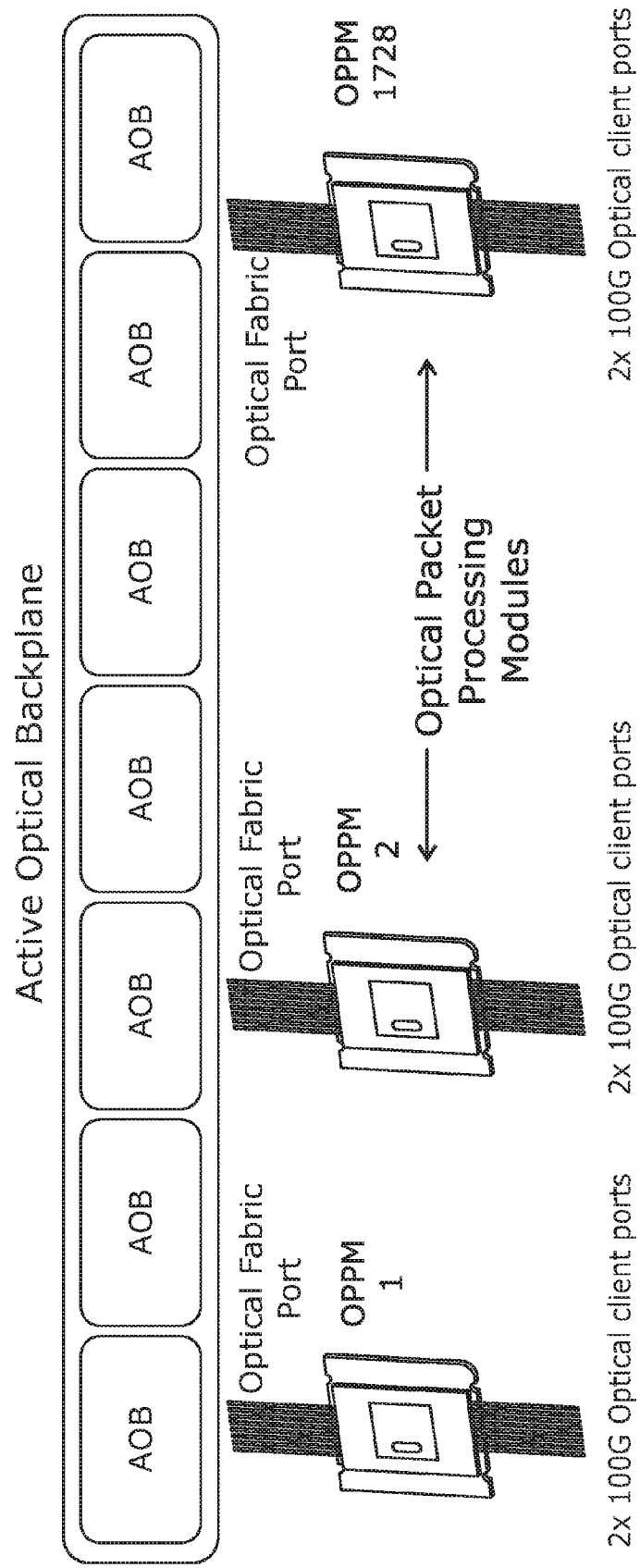
FIG. 7 is a schematic diagram of the active optical backplane in combination with a plurality of optoelectronic switch modules (optical packet processing modules)

FIG. 7 shows an active optical backplane with a plurality of pluggable switch modules. Each switch module takes the form of an optical packet processing switch module having 2×100G optical client ports. Although not shown, it is envisaged that this takes the form of 4×25G inputs and 4×25G outputs.

Figure 8:
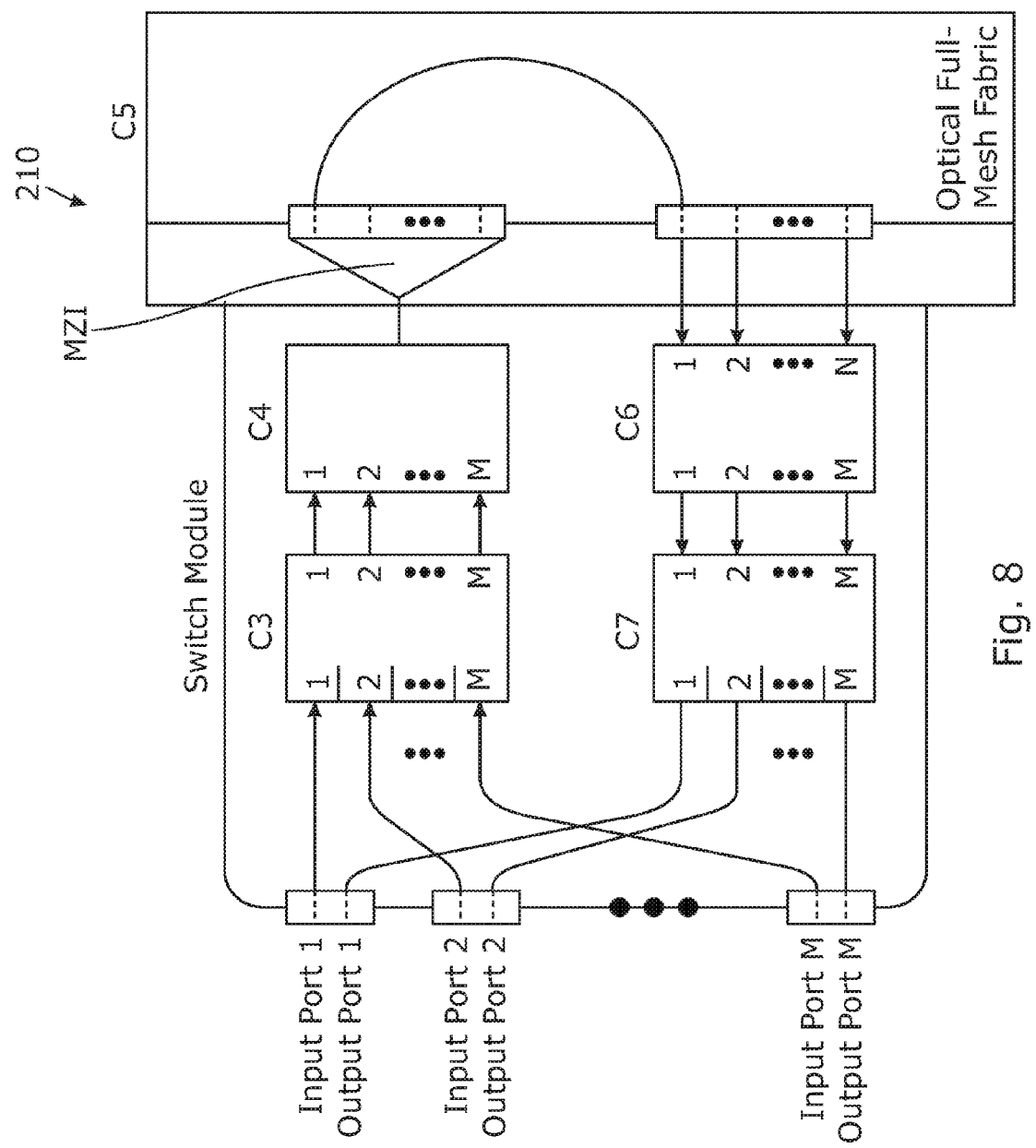
FIG. 8 shows a schematic diagram of an optoelectronic switch module in conjunction with an optical backplane, where the optical backplane includes a Mach Zehnder Interferometer (MZI) router.

FIG. 8 depicts a switch module similar to that of FIG. 3 but in which the MZI router is located inside of the optical backplane C5 rather than on the switch module.

Figure 9:
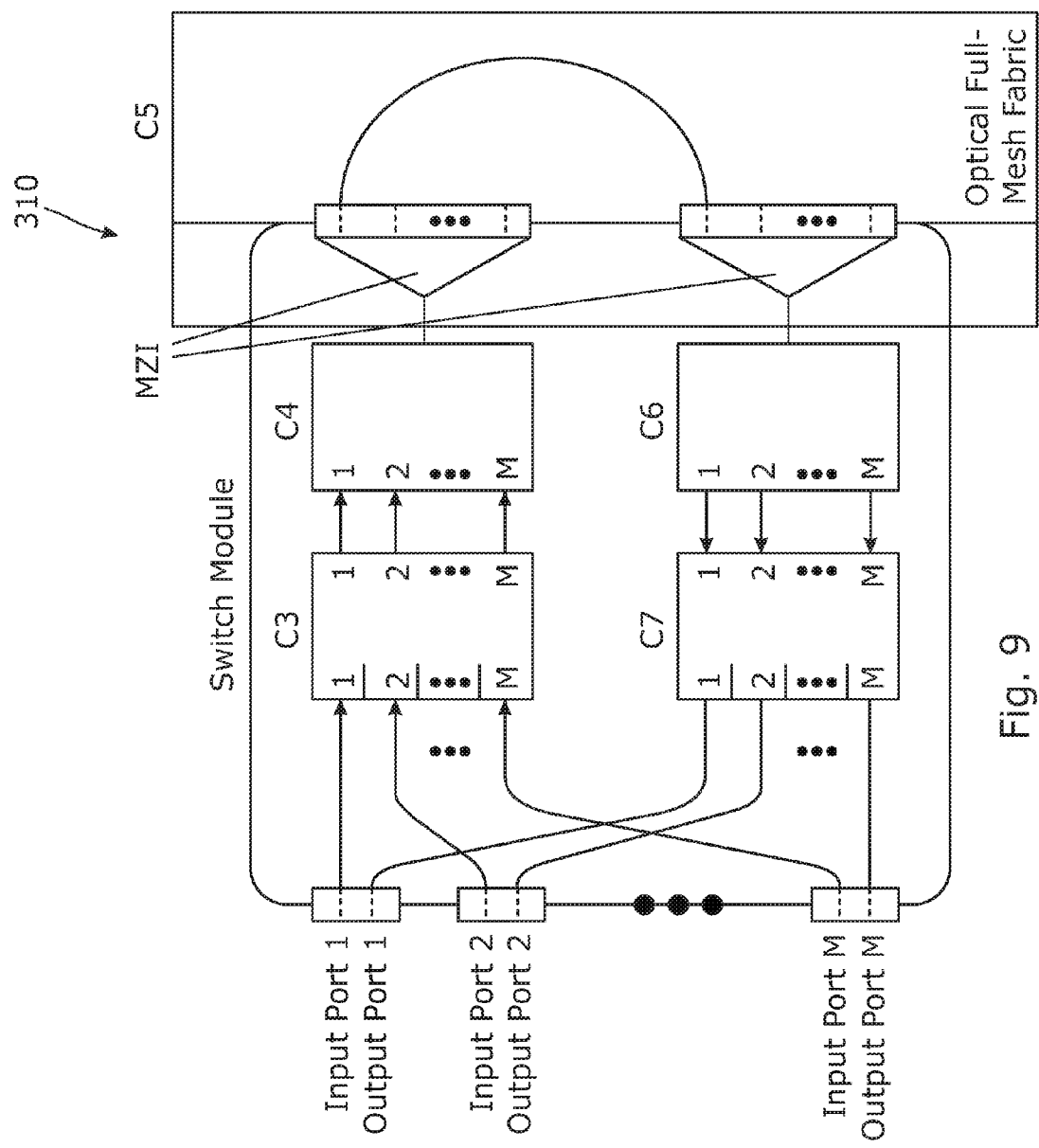
FIG. 9 shows a schematic diagram of a further optoelectronic switch module in conjunction with an optical backplane, again where the optical backplane includes a Mach Zehnder Interferometer (MZI) router.

FIG. 9 depicts a switch module similar to that of FIG. 4 but in which the MZI router is located inside of the optical backplane C5 rather than on the switch module.

Figure 10:
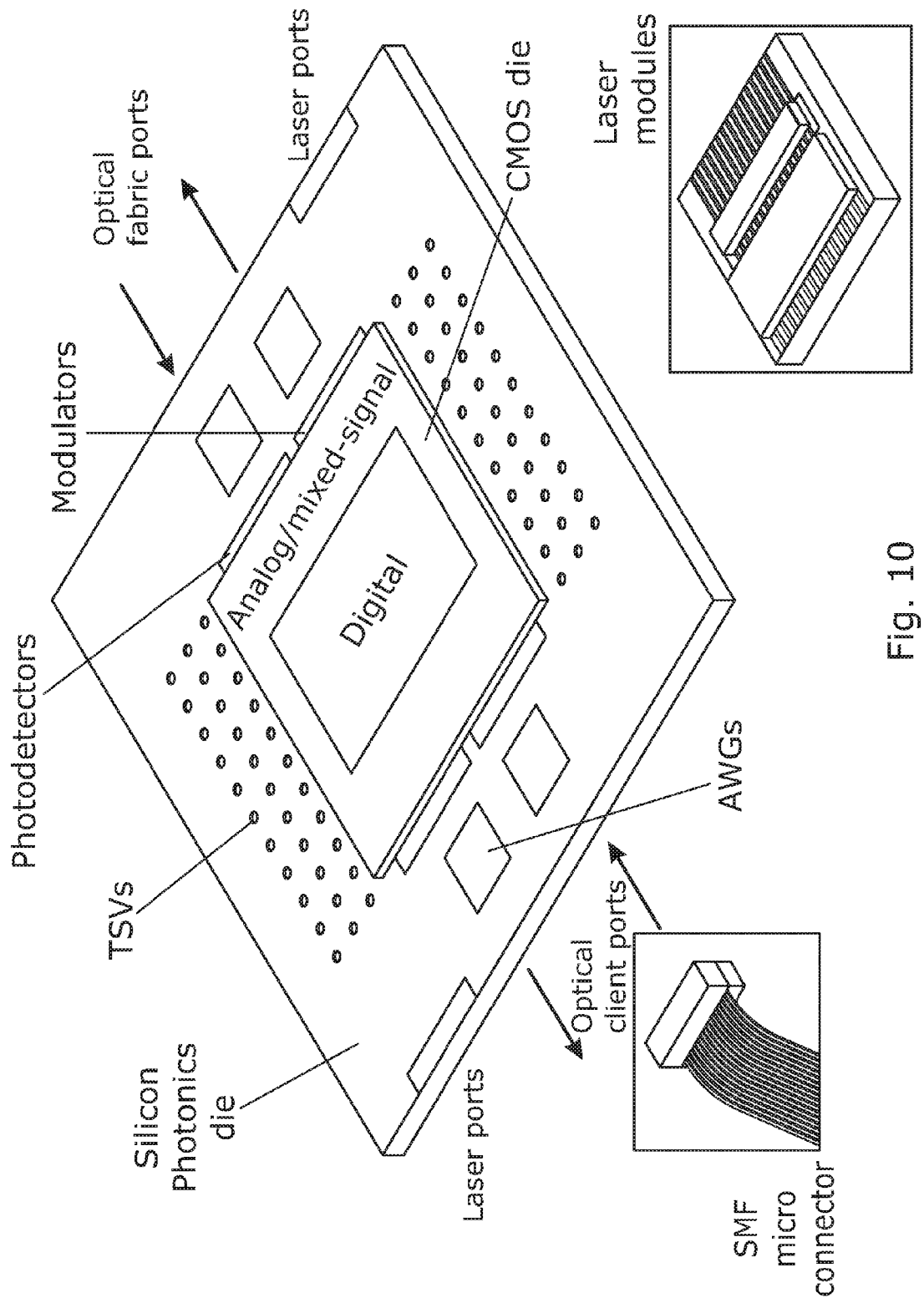
FIG. 10 shows an example of an optoelectronic switch module in the form of an optical packet processing module.

FIG. 10 shows an example of a switch module in the form of an optical packet processing module such as that shown in any of FIGS. 3, 4, 8 and 9. The module consists of a silicon photonics die upon which the optical and electrical components are mounted.

A single CMOS die contains both the pre-backplane DRMs and the post-backplane DRMs. AWGs are shown located at entrances to photodetectors and exits from modulators of the DRMs. However, it should be understood (e.g. as shown in all of FIGS. 3, 4, 8 and 9) that the AWG between the client ports and the photodetector of the pre-mesh DRM could be dispensed with.

External laser modules (shown as inset) provide the N fixed wavelengths which provide fixed wavelength unmodulated light to the modulators of the DRMs.

Figure 11:
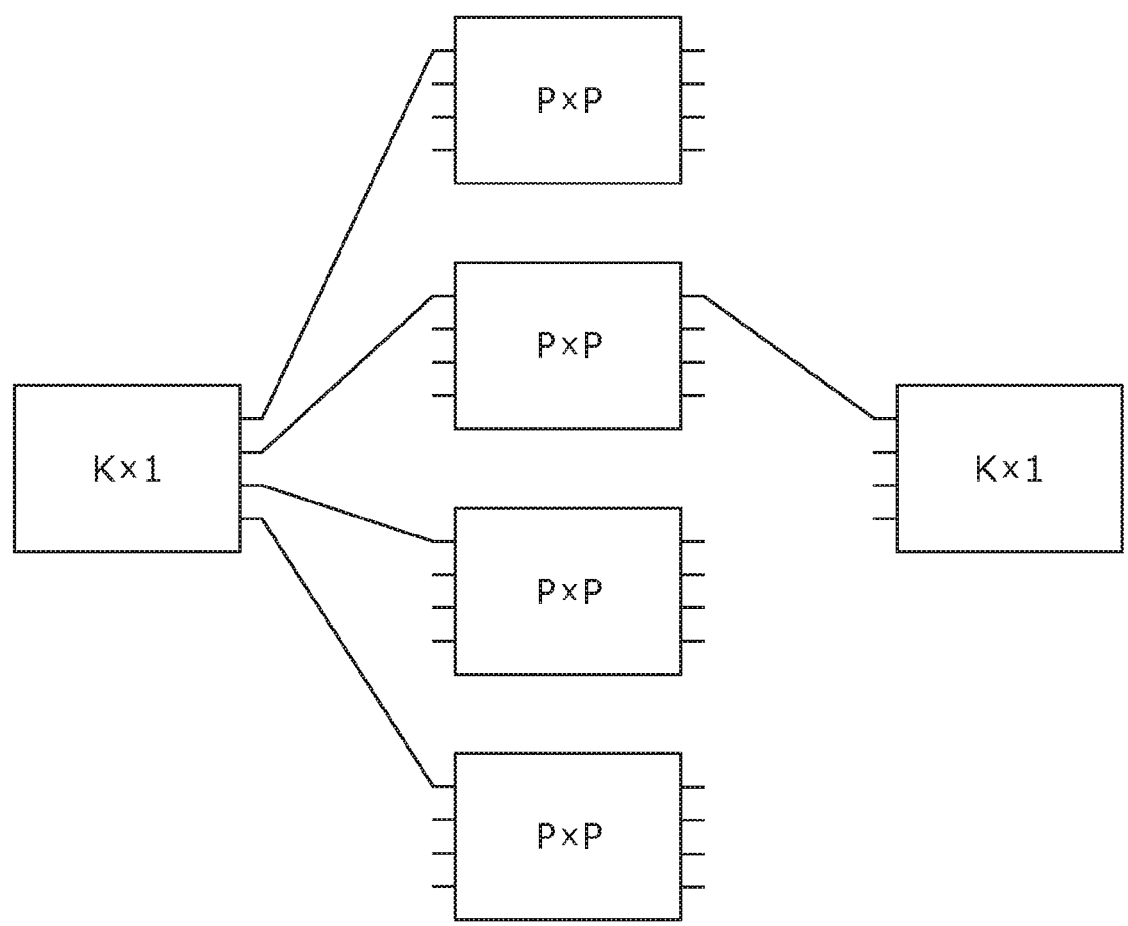
FIG. 11 shows an example of a switch topology.

FIG. 11 shows an active switching mechanism which could be found in the active optical backplane. A combination of K×1 switch stages sandwich an array of P×P switches, which may be MZI switches. A switch mechanism such as this would be particularly beneficial where the active optical backplane provides an optical link across a plurality of dimensions. Examples of set-ups which may be used to construct a P×P MZI switch are shown in FIGS. 18 to 23.

FIGS. 12-17 provide further details in relation to the MZI router.

Figure 12:
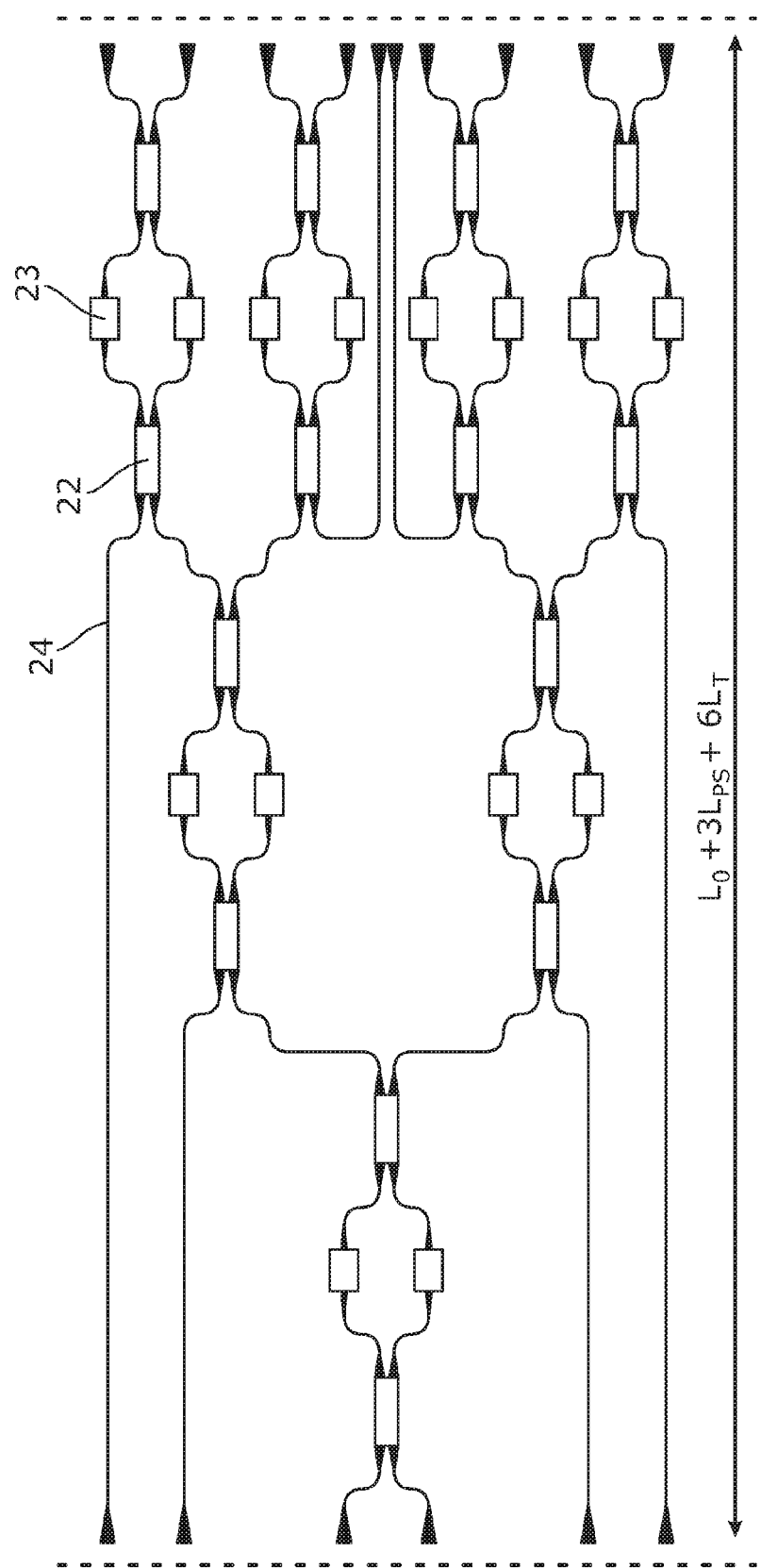
FIG. 12 shows a schematic diagram of an example of a Mach Zehnder Interferometer (MZI) router.
Figure 13:
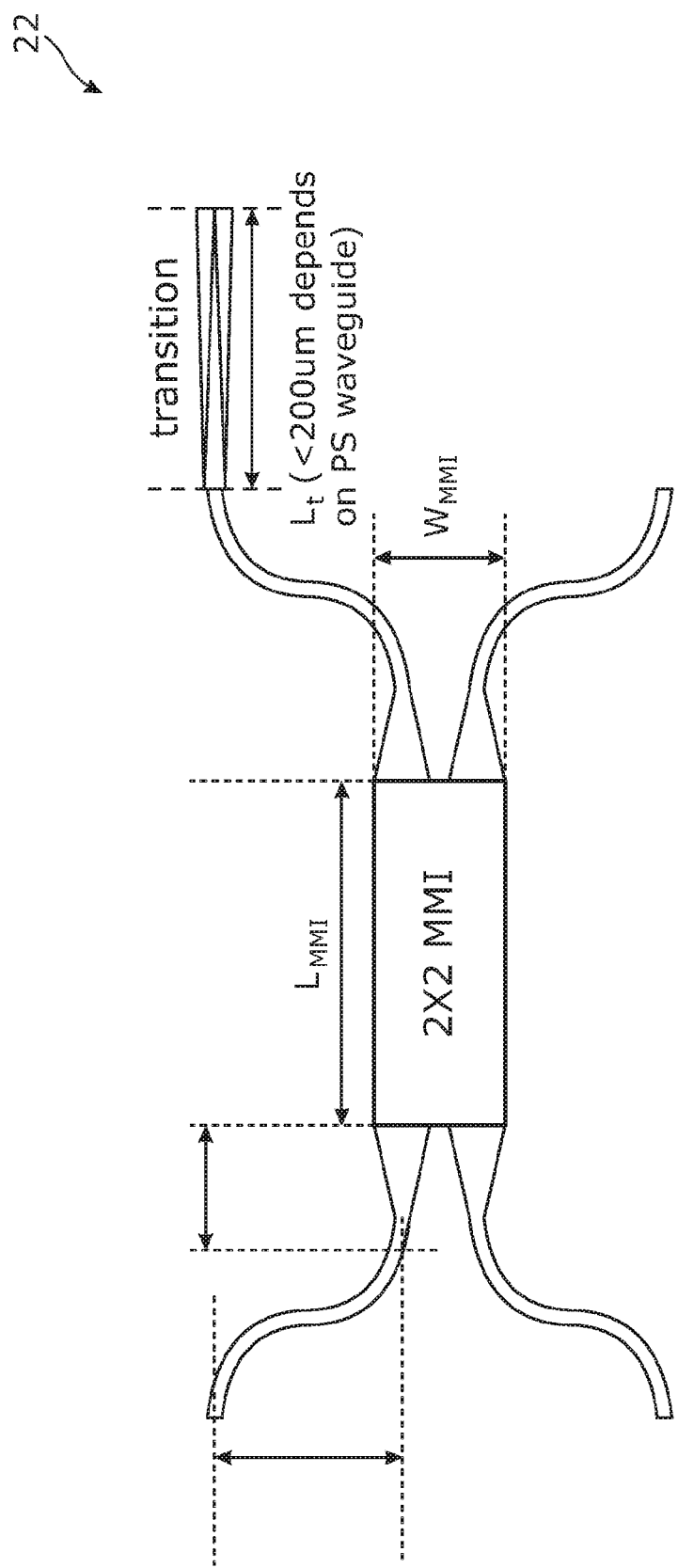
FIG. 13 shows an enlarged view of a coupler and transition region of the MZI router of FIG. 12.
Figure 14:
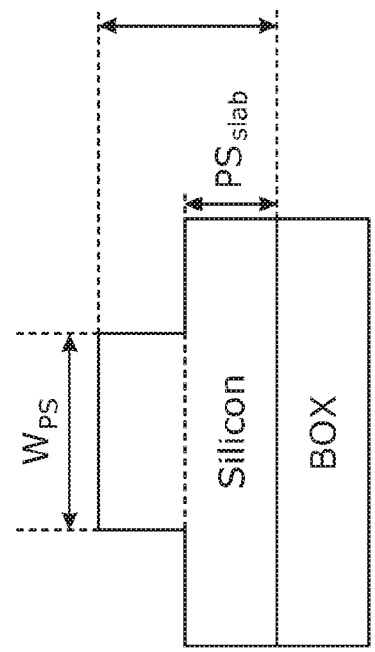
FIG. 14 shows a cross sectional view of the waveguides of the MZI router before and after the transition region.
Figure 14:
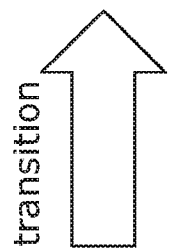
Figure 14:
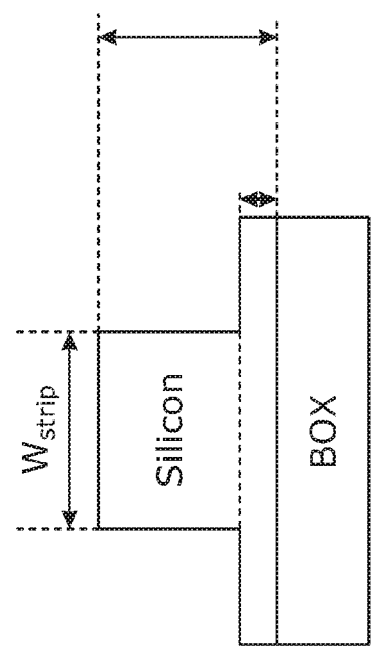

FIGS. 12-14 show an exemplary 1×8 arrangement of MZIs as shown (more simply) in FIG. 1. A tree formation of MZIs is achieved by waveguides 24 which connect to MMI couplers 22 in order to split and recombine optical signals. For each MZI, phase modulation regions 23 are located on both of the two arms of the MZI to control relative phase change between the two arms and therefore switching between each output of the MZI. As shown in FIGS. 13 and 14, each MMI 22 includes transition regions between the MMI couplers and the phase modulation regions. The transition region may be a taper in both the vertical and horizontal direction and enables the waveguides at the MMI coupler to be smaller in size. Examples of suitable dimensions are shown in FIG. 14. In these drawings $L_{PS}$ is the length of the phase-shifter (i.e. the length of the red boxes), and may be in the range of 50 µm to 5 mm, though in embodiments such as those shown in FIGS. 12 to 14, they are most likely in the range from 250 µm to 1 mm. $L_T$ represents the length of the mode transition regions (the horizontal tapers) which convert between the strip waveguides/waveguides exiting the MMI and the PS waveguides.

In FIGS. 12, 13, 14, 16 and 17, in addition to the values set out in the previous paragraph, $L_0$ may be in the range 5000 µm to 10000 µm, $L_1$ may be in the range 50 µm to 500 µm, $W_1$ may be in the range 50 µm to 500 µm, $L_{MMI}$ may be in the range of 50 µm to 1000 µm, $W_{MMI}$ may be in the range 5 µm to 20 µm, $W_{strip}$ may be in the range 1 µm to 4 µm and $PS_{slab}$ may be in the range 0.5 µm to 2 µm.

In these drawings it must be stressed that it is not necessary that all of the inputs or outputs of a given MZI are used. For example, in FIG. 12, the arrangement may be used as a 1×8 MZI switch by using only the left-hand input on the (vertically) central MZI on the left-hand edge of the drawing. This concept is straightforwardly extended to other configurations.

Figure 15:
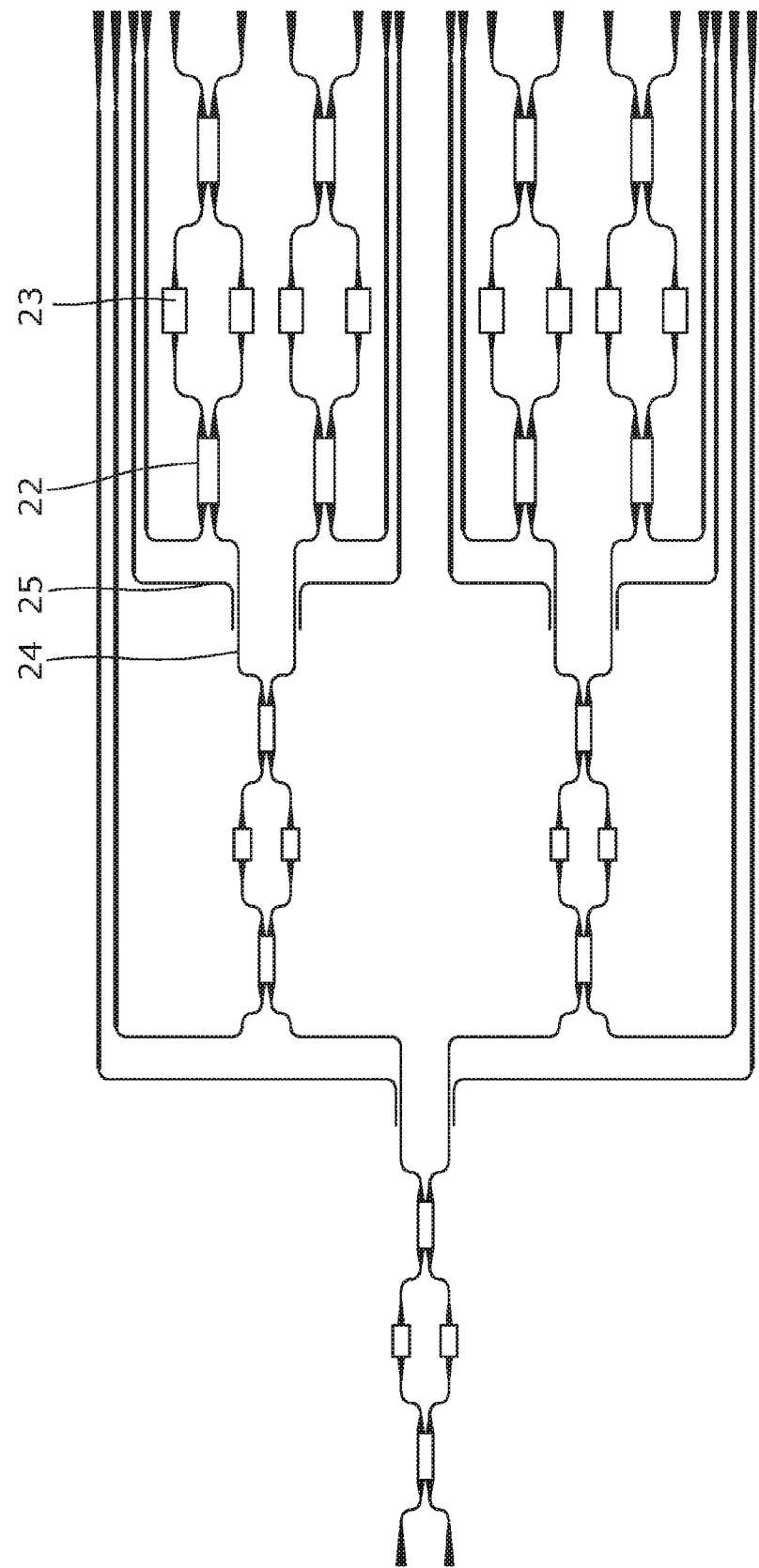
FIG. 15 shows a schematic diagram of an alternative example of a Mach Zehnder Interferometer (MZI) router which includes power taps.
Figure 16:
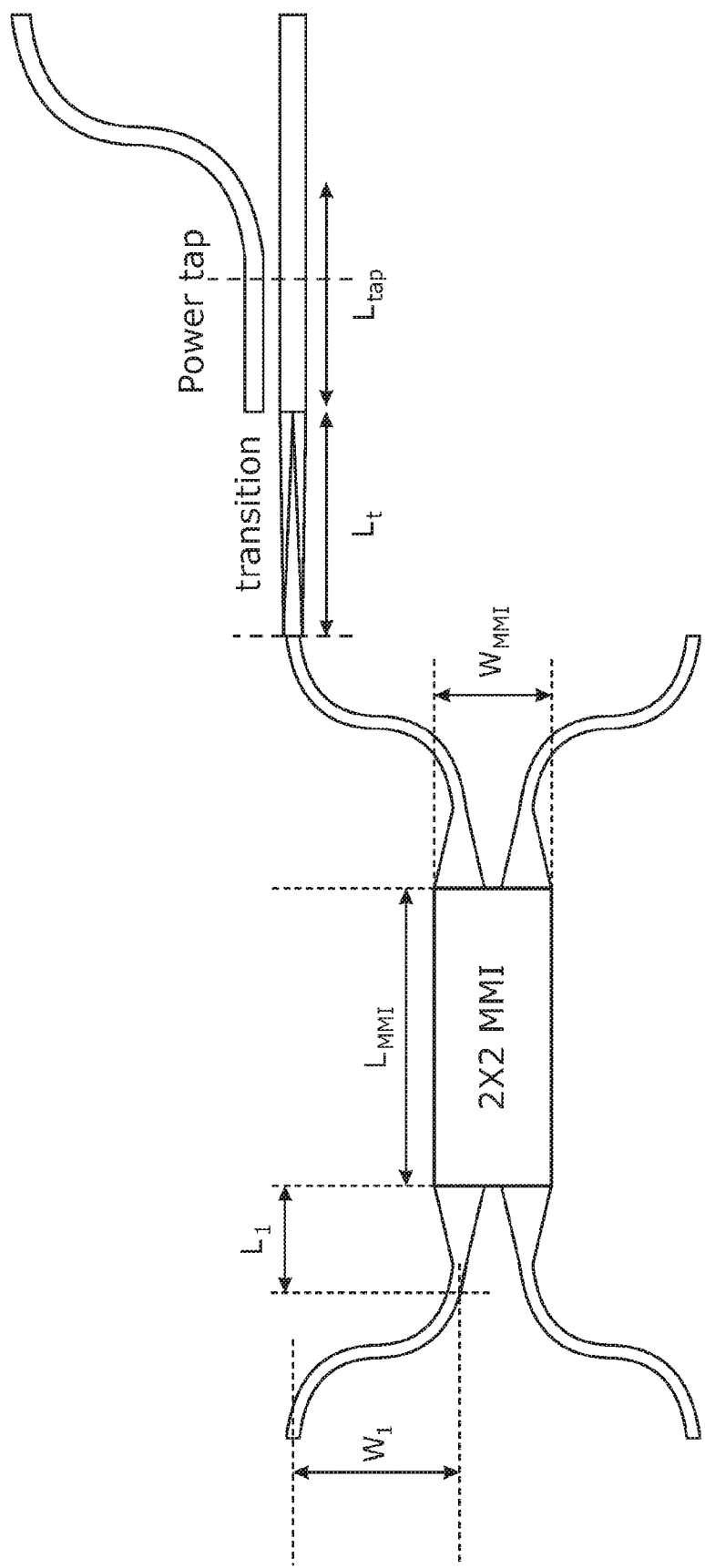
FIG. 16 shows an enlarged view of a coupler and transition region of the MZI router of FIG. 15.
Figure 17:
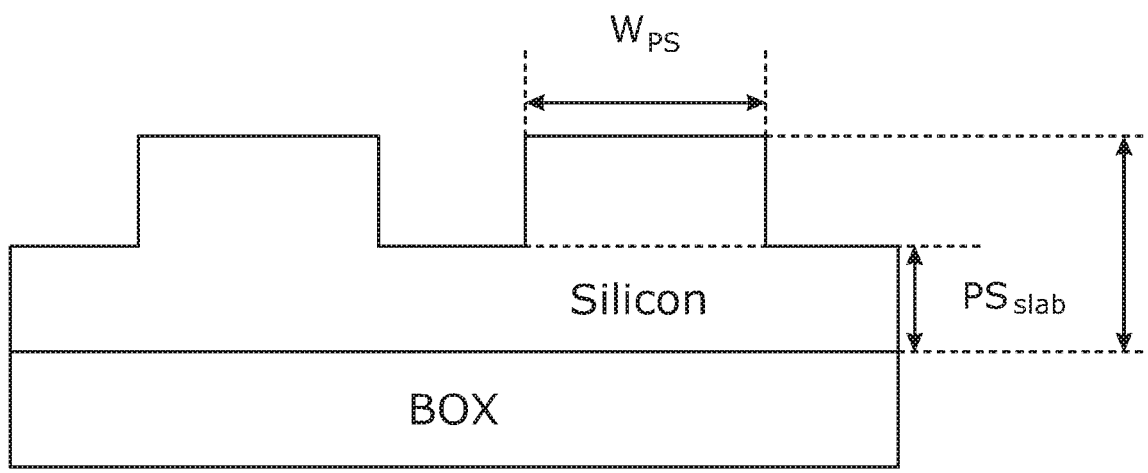
FIG. 17 shows a cross sectional view of the waveguides of the MZI router at the power tap.

FIGS. 15-17 shown an embodiment which differs from that of FIGS. 12-14 in that further waveguides are provides in the form of power taps 25. These are provided at the larger-waveguide side of the tapers.

In alternative embodiments (not shown), MZI routers could be arranged using MMIs and phase modulation regions of a single waveguide size, in which case the embodiments of FIGS. 12-17 would be adapted to remove the transition regions.

FIGS. 18 to 22 show some possible arrangements of the MZIs in the interconnecting region of switches according to embodiments of the present invention. Arrangements such as those shown in these drawings may for part of an optical active switch in some embodiments. Herein, the solid rectangles represent individual MZIs.

Figure 18:
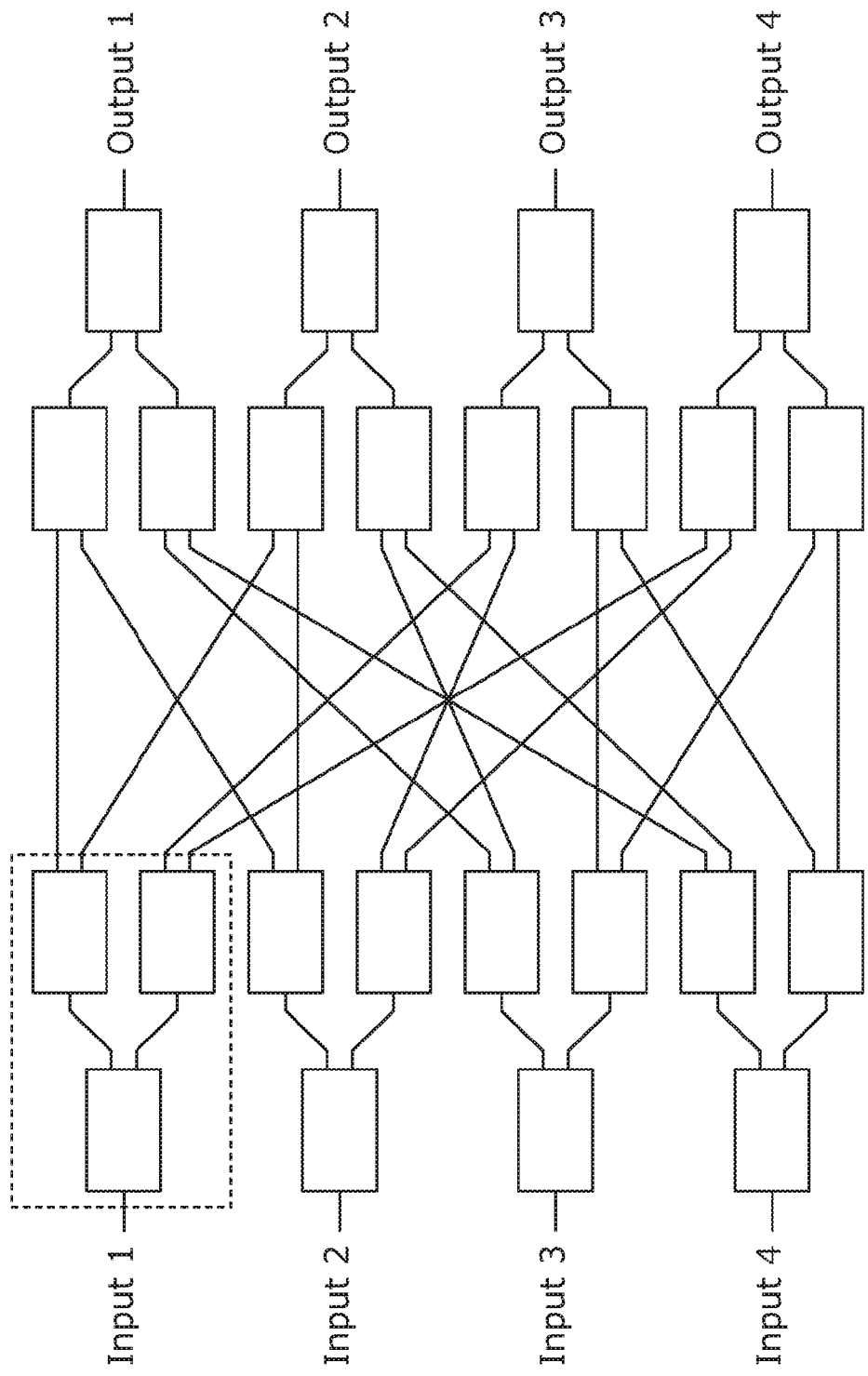
FIG. 18 shows a possible arrangement of MZIs which may be employed in embodiments of the present invention.

FIG. 18 shows an example of the setup in which the MZIs are arranged in the form of an MZI cascade switch with $R_i=4=2^2$ (i.e. n=2) inputs and outputs. The input side may be made up of four 1×4 "trees" (one of which is highlighted in the dashed box), each of which includes two stages of 1×2 MZIs. The output side has a mirror image arrangement. The inner two layers of 1×2 MZIs are connected so that a route can be provided from all inputs to all outputs simultaneously, in a non-blocking fashion. In other words, each of the 4!=24 combinations of input-output which are possible between four inputs and four outputs are accommodated by this MZI cascade switch. A switch driver may be configured to control which of the 24 combinations is to be taken, by controlling the voltage applied across the electro-optic region of each 1×2 MZI.

Figure 19:
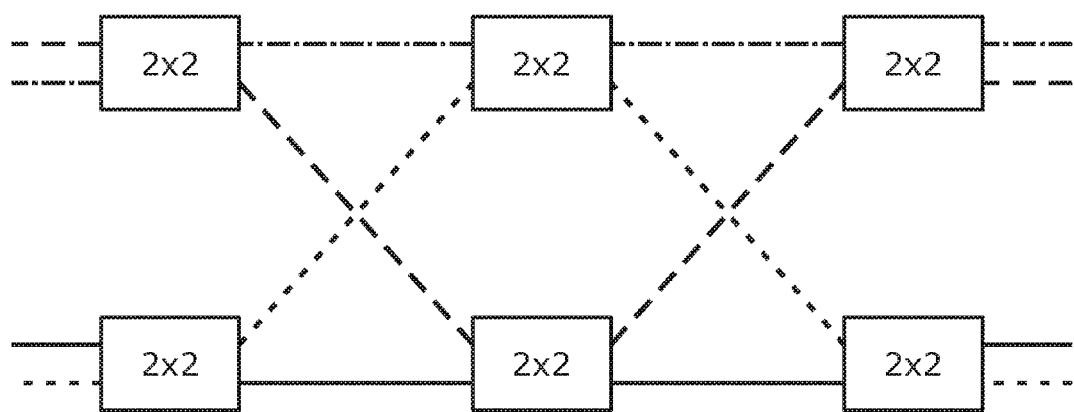
FIG. 19 shows another possible arrangement of MZIs which may be employed in embodiments of the present invention.

FIG. 19 shows an alternative arrangement used to connect 4 inputs and 4 outputs, using only 2×2 MZIs, arranged in a Benes network. It is important to note that in embodiments of the present invention, the same devices may be used for "2×2", "1×2" and "2×1" MZIs, but one input or output may just be left unconnected on the "1" side. Here, total crosstalk at the output of the switch is the same for each output port, for each permutation of the switches.

Figure 20:
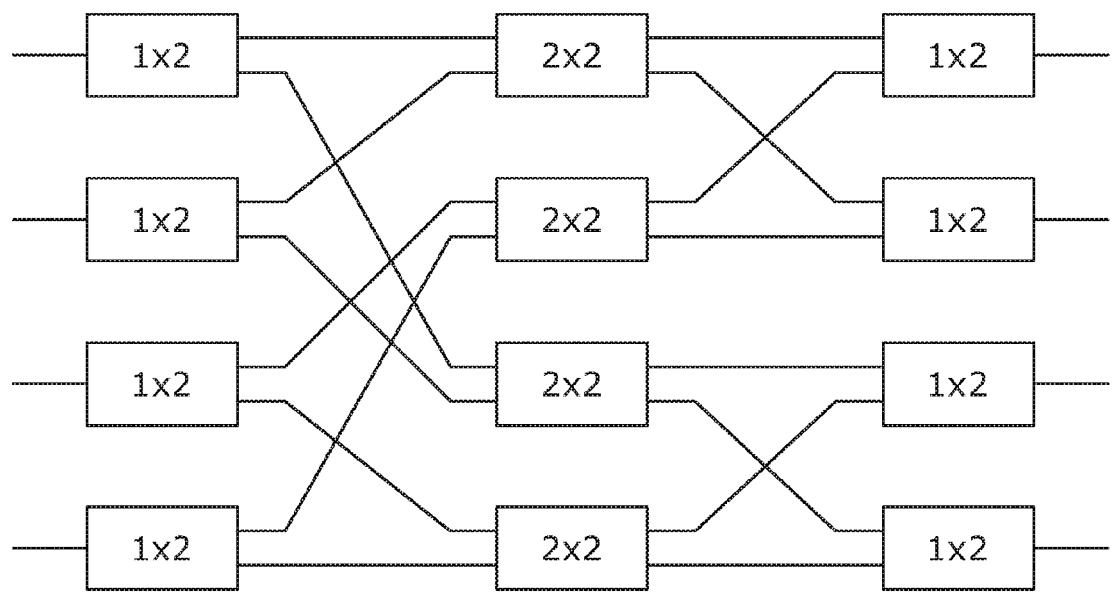
FIG. 20 shows another possible arrangement of MZIs which may be employed in embodiments of the present invention.

FIG. 20 shows yet another possible arrangement which may be used to connect 4 inputs and 4 outputs. This is a "hybrid" arrangement which includes both 1×2 and 2×2 MZIs.

Figure 21:
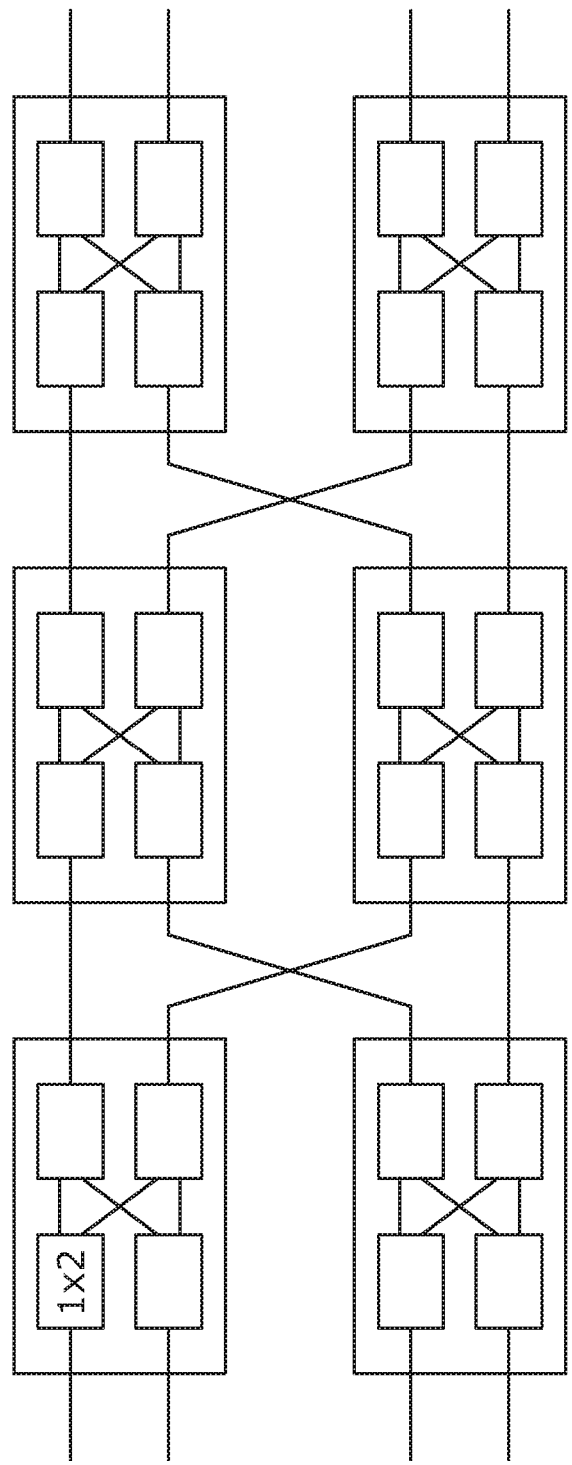
FIG. 21 shows another possible arrangement of MZIs which may be employed in embodiments of the present invention.
Figure 22:
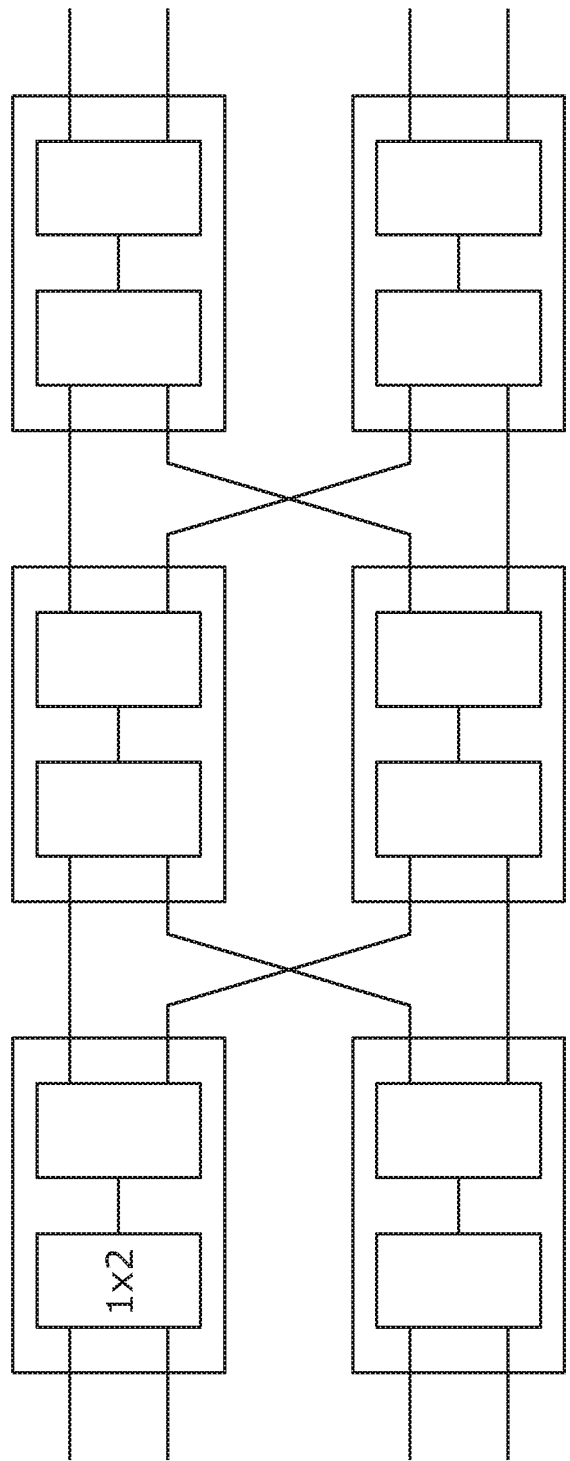
FIG. 22 shows another possible arrangement of MZIs which may be employed in embodiments of the present invention.

FIG. 21 shows a similar arrangement to that shown in FIG. 19, based on a Benes network. This arrangement is non-blocking. However, in this particular example, rather than using an arrangement of six 2×2 MZIs, each 2×2 MZI is replaced by an arrangement of four 1×2 MZIs, arranged to provide the same connectivity as shown in the drawings. Again, this arrangement is used to connect 4 inputs to 4 outputs. FIG. 22 shows another similar arrangement, in which the 2×2 MZIs of FIG. 19 are replaced by two 1×2 MZIs. This arrangement requires only half the number of components as that of FIG. 21, but is not a non-blocking arrangement.

Figure 23:
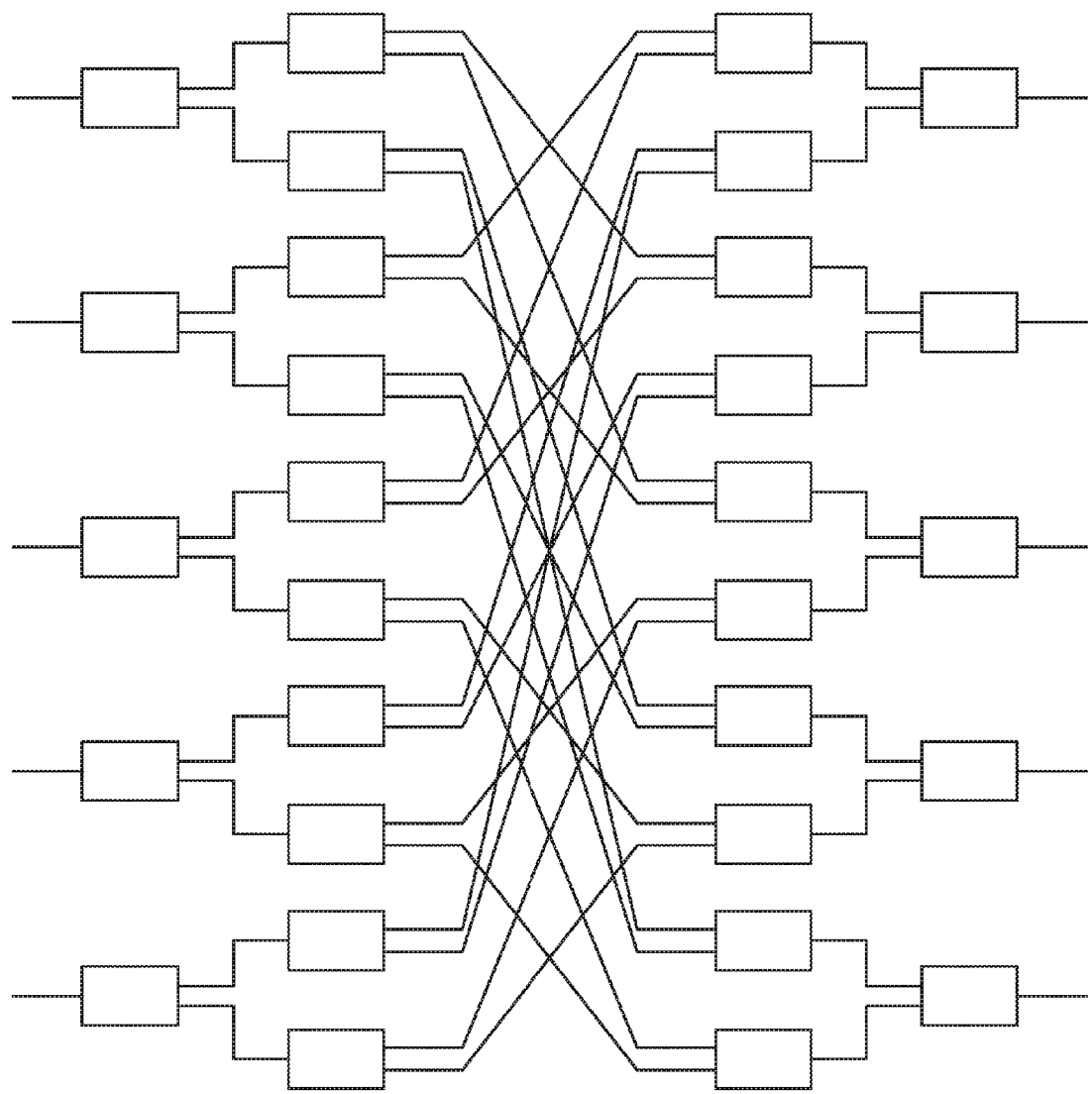
FIG. 23 shows another possible arrangement of MZIs which may be employed in embodiments of the present invention.

FIG. 23 shows a similar arrangement to that in FIG. 18, with the addition of an additional input and an additional output. Here, an additional port is supported by building $R_t+1$ While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An optoelectronic switch for switching a signal from an input device to an output device, the optoelectronic switch including a plurality of switch modules, each connected or connectable to an optical interconnecting region, wherein:
   each switch module is configured to output a WDM output signal to the optical interconnecting region, and
   the optoelectronic switch further includes one or more MZI routers, each configured to direct the WDM output signal from its source switch module towards its destination switch module, the one or more MZI routers located either:
   on the switch modules, or
   in the optical interconnecting region.

2. An optoelectronic switch according to claim 1 wherein the one or more MZI routers include an electro-optic MZI.

3. An optoelectronic switch according to claim 1 wherein an MZI router, of the one or more MZI routers, includes:
   a plurality of MZI switches arranged in a matrix.

4. An optoelectronic switch according to claim 3 wherein the MZI router is a 1×N router, the plurality of MZI switches arranged in a tree formation.

5. An optoelectronic switch according to claim 1 wherein the optical interconnecting region includes, or is in the form of, an optical backplane.

6. An optoelectronic switch according to claim 1 wherein:
   the optical interconnecting region includes an intermediate switching device having a plurality of inputs and outputs, and
   a pre-interconnect MZI router is connected between the source switch module and the intermediate switching device, and is configured to receive the WDM output signal from the source switch module.

7. An optoelectronic switch according to claim 6 wherein the pre-interconnect MZI router is configured to direct the WDM output signal to an input of the intermediate switching device corresponding to an output of the intermediate switching device corresponding to the destination switch module.

8. An optoelectronic switch according to claim 6 further including a controller connected to an MZI router, of the one or more MZI routers, the controller configured to control the direction of the WDM output signal within the pre-interconnect MZI router.

9. An optoelectronic switch according to claim 8 wherein the controller is configured to control the direction of the WDM output signal based on destination information contained in the WDM output signal.

10. An optoelectronic switch according to claim 6 further including a post-interconnect MZI router connected between the intermediate switching device and the destination switch module.

11. An optoelectronic switch according to claim 10 wherein the post-interconnect router is configured to direct WDM signals which are output from the intermediate switching device towards their respective destination switch modules.

12. An optoelectronic switch according to claim 6 wherein each switch module includes:
   a plurality of client-facing input ports connectable to the input device;
   a corresponding plurality of client-facing output ports connectable to the output device;
   an outgoing optical connection to the optical interconnecting region; and
   an incoming optical connection from the optical interconnecting region.

13. An optoelectronic switch according to claim 12, wherein there are M client-facing input ports, and M client-facing output ports.

14. An optoelectronic switch according to claim 13 wherein each switch module includes:
   a plurality of detector-remodulators (DRMs), each configured to receive one or more optical signals from one of the input ports and to change the wavelength of and/or regenerate the received signals to produce respective DRM optical outputs,
   a pre-interconnect AWG configured to multiplex M DRM optical outputs into the WDM output signal which is output to the optical interconnecting region.

15. An optoelectronic switch according to claim 14 wherein each DRM of the plurality of DRMs includes:
   a photodetection stage configured to receive the optical signals from a respective one of the input ports of the switch module and to convert the optical signals into one or more electrical signals;
   a CMOS chip for processing the electrical signals;
   a modulation stage for: receiving the processed electrical signal(s) signals from the CMOS chip; receiving unmodulated light input having a fixed wavelength; and for modulating the unmodulated light according to the output of the CMOS chip.

16. An optoelectronic switch according to claim 15 wherein the DRM is configured to operate in burst mode.

17. An optoelectronic switch according to claim 15 wherein processing of the electrical signals by the CMOS chip includes one or more of: concentration, amplification, reshaping, re-timing, and filtering of the signal before it is received by the modulation stage.

18. An optoelectronic switch according to claim 14 wherein the pre-interconnect MZI router is configured to receive the WDM output signal from the pre-interconnect AWG.

19. An optoelectronic switch according to claim 14 wherein the pre-interconnect AWG is a cyclic AWG.

20. An optoelectronic switch according to claim 14 wherein each switch module further includes a post-interconnect AWG configured to route optical signals received at the incoming optical connection from the optical interconnecting region towards their respective destination switch modules.

21. An optoelectronic switch according to claim 20 wherein the post-interconnect AWG is an N×M AWG, the post-interconnect AWG having N inputs and M outputs, each of the N inputs connected to a respective output of the intermediate switching device and each of the M outputs of the N×M AWG for communicating a signal to one or more of the M outputs of the switch module.

22. An optoelectronic switch according to claim 20 wherein the post-interconnect AWG is a 1×M AWG; and the optoelectronic switch further comprises a post-interconnect MZI router;
wherein the 1×M AWG has a single input and M outputs, the single input connected to the post-interconnect MZI router and each of the M outputs of the 1×M AWG for communicating a signal to one or more of the M outputs of the switch module.

23. An optoelectronic switch according to claim 20 wherein the post-interconnect AWG is a non-cyclic AWG.

24. An optoelectronic switch according to claim 20 further comprising a second array of DRMs located after the post-interconnect AWG, each DRM of the second array configured to convert the wavelength of and/or regenerate a signal from a respective output port of the post-interconnect AWG for communication to an output port of the switch module.

25. An optoelectronic switch according to claim 1 wherein the optical interconnecting region includes a passive fibre shuffle.

26. An optoelectronic switch according to claim 1, configured to act as an optoelectronic packet switch.

27. A switch module for pluggably connecting to an optical interconnecting region, the switch module comprising:
a plurality M of client-facing input ports and a corresponding plurality M of client-facing output ports;
an outgoing optical connection to the optical interconnecting region and an incoming optical connection to the optical interconnecting region;
an array of DRMs each DRM of the array configured to receive one or more optical signals from one of the input ports of the switch module and to change the wavelength of and/or regenerate the received signals to produce respective DRM optical outputs;
a pre-interconnect AWG, the pre-interconnect AWG acting as a multiplexor to multiplex M inputs to a wavelength division multiplexed (WDM) output signal; and
a post-interconnect AWG configured to route optical signals received at the incoming optical connection of the switch module from the optical interconnecting region to one or more of the client-facing output ports.

28. The switch module of claim 27, further comprising:
an MZI router configured to receive the WDM output signal from the pre-interconnect AWG, and to switch the WDM signal before it enters the optical interconnecting region to route the WDM signal to a destination switch module; the MZI router being located on the switch module.

29. The switch module of claim 27, being suitable for pluggably connecting to an active optical backplane.

30. An active backplane for use with the switch module of claim 29, the active optical backplane comprising:
a plurality of optical inputs paired with respective outputs, each input/output pair for connecting to a respective switch module, each input for receiving a WDM optical signal from said respective switch module;
a passive fibre shuffle; and
an MZI router located between each optical input of the active backplane and the passive fibre shuffle; wherein the MZI router is configured as a switch to select a fibre for any given signal through the passive fibre shuffle.

31. An optoelectronic switch according to claim 1 wherein each optoelectronic switch module is constructed on one or more silicon-on-insulator photonic platforms.

32. An optoelectronic switch comprising:
N switch modules; and
an optical backplane which includes a passive fibre shuffle;
wherein each switch module is connectable to the optical backplane, each switch module comprising:
M client-facing input ports, and M corresponding client-facing output ports;
an outgoing optical connection to the optical backplane and an incoming optical connection to the optical backplane;
an plurality of Detector Remodulators (DRMs) each DRM of the plurality configured to receive one or more optical signals from one of the input ports of the switch module and to regenerate and/or change the wavelength of the received signals to produce respective DRM optical outputs;
a pre-backplane AWG, the pre-backplane AWG configured as a multiplexor to multiplex M inputs to a wavelength division multiplexed (WDM) output signal; and
a post-backplane AWG configured route optical signals received at the incoming optical connection of the switch module from the backplane to one or more of the client-facing output ports;
wherein the optoelectronic switch further comprises a Mach Zehnder Interferometer (MZI) router configured to receive the WDM output signal from the pre-backplane AWG, and to switch the WDM signal before it enters the passive fibre shuffle to choose a destination switch module; the Mach Zehnder Interferometer router being located either:
on the switch module; or
within the optical backplane, between the switch module and the passive fibre shuffle.

* * * * *